United States Patent
Zhao

(10) Patent No.: US 12,082,040 B2
(45) Date of Patent: Sep. 3, 2024

(54) SERVICE DATA ADAPTATION PROTOCOL ENTITY MAINTENANCE METHOD, TRANSMITTING TERMINAL AND RECEIVING TERMINAL

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 26 days.

(21) Appl. No.: 17/624,326

(22) PCT Filed: Jun. 5, 2020

(86) PCT No.: PCT/CN2020/094552
§ 371 (c)(1),
(2) Date: Dec. 31, 2021

(87) PCT Pub. No.: WO2021/000695
PCT Pub. Date: Jan. 7, 2021

(65) Prior Publication Data
US 2022/0369158 A1 Nov. 17, 2022

(30) Foreign Application Priority Data

Jul. 2, 2019 (CN) .......................... 201910588987.6
Sep. 12, 2019 (CN) .......................... 201910865311.7

(51) Int. Cl.
*H04W 76/00* (2018.01)
*H04W 28/02* (2009.01)
(Continued)

(52) U.S. Cl.
CPC ....... *H04W 28/0273* (2013.01); *H04W 28/24* (2013.01); *H04W 76/10* (2018.02);
(Continued)

(58) Field of Classification Search
CPC . H04W 28/0273; H04W 28/24; H04W 76/10; H04W 76/25; H04W 76/30;
(Continued)

(56) References Cited

U.S. PATENT DOCUMENTS

| | | | |
|---|---|---|---|
| 2020/0100136 A1 | 3/2020 | Chang et al. | |
| 2020/0280886 A1 | 9/2020 | Hori et al. | |
| 2021/0084526 A1 | 3/2021 | Wu | |

FOREIGN PATENT DOCUMENTS

| | | | | |
|---|---|---|---|---|
| CN | 109041119 A | | 12/2018 | |
| CN | 109151915 A | * | 1/2019 | ........ H04W 28/0252 |
| WO | 2019098267 A1 | | 5/2019 | |

OTHER PUBLICATIONS

Samsung: (SL RBs/LCHs and SL RB Configurations for NR Sidelink, 3GPP Draft; R2-1905728_SL RBS LCHS and SL RB Configurations for N Sidelink, 3rd Generation Partnership Project (3GPP), May 2019 (May 13, 2019)).*

(Continued)

*Primary Examiner* — Lakeram Jangbahadur
(74) *Attorney, Agent, or Firm* — Ladas & Parry, LLP

(57) ABSTRACT

The present disclosure provides an SDAP entity maintenance method, a transmitting terminal and a receiving terminal. The SDAP entity maintenance method includes: maintaining the SDAP entity based on a destination identifier; wherein, the destination identifier includes: a sidelink communication destination ID; or the destination identifier includes: a combination of a sidelink communication source ID and the sidelink communication destination ID; or the destination identifier includes: a combination of the sidelink communication destination ID and a cast type; or the des- (Continued)

tination identifier includes: a combination of the sidelink communication source ID, the sidelink communication destination ID, and the cast type; or the destination identifier includes: a user ID of the transmitting terminal.

12 Claims, 4 Drawing Sheets

(51) Int. Cl.
| | |
|---|---|
| *H04W 28/24* | (2009.01) |
| *H04W 76/10* | (2018.01) |
| *H04W 76/25* | (2018.01) |
| *H04W 76/30* | (2018.01) |
| *H04W 92/18* | (2009.01) |

(52) U.S. Cl.
CPC ........... *H04W 76/25* (2018.02); *H04W 76/30* (2018.02); *H04W 92/18* (2013.01)

(58) Field of Classification Search
CPC ..... H04W 92/18; H04W 76/11; H04W 88/02; H04W 76/14; H04W 28/065; H04W 28/06; H04W 28/0252; H04W 80/02
See application file for complete search history.

(56) References Cited

OTHER PUBLICATIONS

CATT (SDAP Open Issues, R2-1903175, Apr. 2019).*
A. "3rd Generation Partnership Project; Technical Specification Group Radio Access Network; E-UTRA and NR; Service Data Adaptation Protocol (SDAP) specification (Release 15)",3GPP Standard; Technical Specification;3GPP TS 37.324, 3rd Generation Partnership Project (3GPP), No. V15.1.0, Sep. 25, 2018. Sep. 2018.*
Extended European Search Report for European Patent Application 20834407.7 issued on Jul. 26, 2022.
"3rd Generation Partnership Project; Technical Specification Group Radio Access Network; E-UTRA and NR; Service Data Adaptation Protocol (SDAP) specification," 3GPP TS 37.324 V15.1.0, Sep. 2018, all pages.
"SDAP Open Issues," 3GPP TSG-RAN WG2 Meeting #105bis, R2-1903175, Xi'an, China, Apr. 8-12, 2019, Source: CATT, Agenda Item: 11.4.6a, all pages.
"SL RBs/LCHs and SL RB Configurations for NR Sidelink," 3GPP TSG-RAN2 106, R2-1905728, Reno, USA, May 13-May 17, 2019, Agenda item: 11.4.6, Source: Samsung, all pages.
First Office Action for Japanese Patent Application 2022-500078, issued on Dec. 6, 2022 and its English translation provided by Global Dossier.
"TP to TR 38.885 on QoS support for NR V2X," 3GPP TSG-RAN WG2 Meeting #105, R2-1902500, Athens, Greece, Feb. 25-Mar. 1, 2019, Agenda Item: 11.4.5, Source: Huawei, HiSilicon, all pages.
"SDAP Layer for NR Sidelink Unicast," 3GPP TSG-RAN WG2 Meeting #106, R2-1907834, Reno, USA, May 13-May 17, 2019, Agenda Item: 11.4.6, Source: Samsung, all pages.
"TS 23.287 NR PC5 QoS," SA WG2 Meeting #133, S2-1905480, May 13-17, 2019, Reno, Nevada, USA, Source: LG Electronics, Agenda Item: 6.6, all pages.
"3rd Generation Partnership Project" 3GPP TS 38.331 V15.6.0 (Jun. 2019), Technical Specification Group Radio Access Network; NR; Radio Resource Control (RRC) protocol specification (Release 15), all pages.
"3rd Generation Partnership Project" 3GPP TS 23.287 V1.0.0 (May 2019) , release 16, Technical Specification Group Services and System Aspects; Architecture enhancements for 5G System (5GS) to support Vehicle-to-Everything (V2X) services (Release 16), all pages.
"SDAP Configuration Aspects," 3GPP TSG-RAN WG2 Meeting #101, Tdoc R2-1803158, Athens, Greece, Feb. 26-Mar. 2, 2018, Agenda Item: 10.3.4.4, Source: Ericsson.
"Discussion on the configuration of SDAP," 3GPP TSG-RAN WG2 Meeting #99bis, R2-1710933, Prague, Czech Republic, Oct. 9-13, 2017, Agenda Item: 10.4.1.3.2, Source: Vivo.
International Search Report for PCT Application PCT/CN2020/094552 issued on Sep. 8, 2020, and its English Translation provided by WIPO.
Written Opinion for PCT Application PCT/CN2020/094552 issued on Sep. 8, 2020, and its English Translation provided by WIPO.
International preliminary report on patentability for PCT Application PCT/CN2020/094552 issued on Dec. 28, 2021, and its English Translation provided by WIPO.
Office action from corresponding Korean Patent Application No. 10-2022-7001842 dated Jun. 28, 2024, and its English translation.
Vivo, R2-1905851, "PC5 SDAP protocol in NR V2X", 3GPP TSG RAN WG2 #106, 3GPP server publication date (May 3, 2019), Reno, USA, May 13-17, 2019.

\* cited by examiner

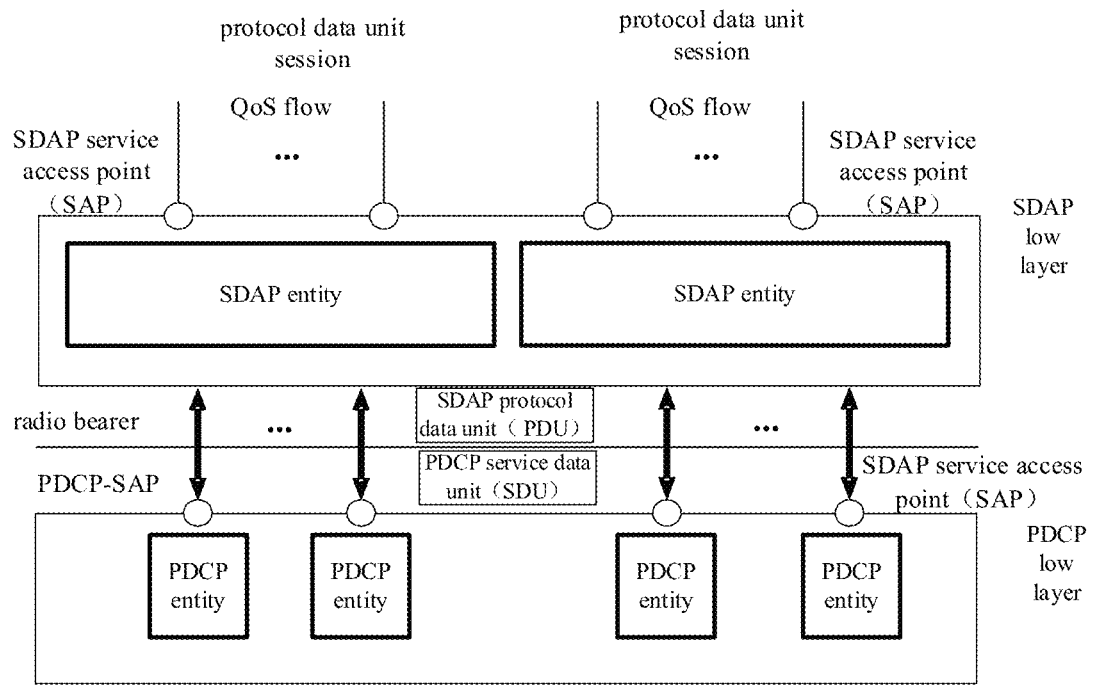
Fig. 3
maintaining an SDAP entity based on a destination identifier — 41
Fig. 4
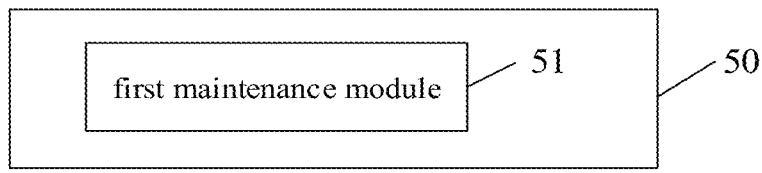
Fig. 5

SERVICE DATA ADAPTATION PROTOCOL ENTITY MAINTENANCE METHOD, TRANSMITTING TERMINAL AND RECEIVING TERMINAL

CROSS-REFERENCE TO RELATED APPLICATIONS

This application is the U.S. national phase of PCT Application No. PCT/CN2020/094552 filed on Jun. 5, 2020, which claims priorities to the Chinese patent application No. 201910588987.6 filed on Jul. 2, 2019 and the Chinese patent application No. 201910865311.7 filed on Sep. 12, 2019, the disclosures of which are incorporated herein by reference in their entireties.

TECHNICAL FIELD

The present disclosure relates to the field of communications technology, in particular to a Service Data Adaptation Protocol (SDAP) entity maintenance method, a transmitting terminal a receiving terminal.

BACKGROUND

For the fifth generation (5G) communication system, in order to support vertical applications in the industry, the New Radio (NR) vehicle to everything (V2X) is introduced.

Relevant technologies have clarified that NR V2X needs to support the layer of Service Data Adaptation Protocol (SDAP), but there is no relevant solution for how to maintain (establish/release) an SDAP entity.

SUMMARY

An object of the present disclosure is to provide an SDAP entity maintenance method, a transmitting terminal and a receiving terminal, thereby solving the problem in NR V2X that there is no specific means to maintain the SDAP entity and reliability of communication service cannot be guaranteed.

In order to solve the above technical problem, an embodiment of present disclosure provides a Service Data Adaptation Protocol (SDAP) entity maintenance method, applied to a transmitting terminal, including: maintaining the SDAP entity based on a destination identifier; wherein, the destination identifier includes: a sidelink communication destination ID; or the destination identifier includes: a combination of a sidelink communication source ID and the sidelink communication destination ID; or the destination identifier includes: a combination of the sidelink communication destination ID and a cast type; or the destination identifier includes: a combination of the sidelink communication source ID, the sidelink communication destination ID, and the cast type; or the destination identifier includes: a user ID of the transmitting terminal.

Optionally, maintaining the SDAP entity based on a destination identifier includes: receiving an establishment request or an establishment message of a first Quality of Service (QoS) flow associated with a first destination ID, and establishing an SDAP entity corresponding to the first destination ID.

Optionally, maintaining the SDAP entity based on a destination identifier includes: receiving a first data packet of a QoS flow associated with a second destination ID, and establishing an SDAP entity corresponding to the second destination ID.

Optionally, maintaining the SDAP entity based on a destination identifier includes: establishing a radio link control (RLC) entity and/or a packet data convergence protocol (PDCP) entity corresponding to a sidelink communication interface radio bearer, if a destination identifier corresponding to the RLC entity and/or the PDCP entity does not have a corresponding SDAP entity, establishing the corresponding SDAP entity.

Optionally, maintaining the SDAP entity based on a destination identifier includes: transmitting first request information to a network device, wherein the first request information is used to request to obtain sidelink communication interface radio bearer (SLRB) configuration information corresponding to a QoS flow associated with a third destination ID; receiving a first response message fed back by the network device, wherein the first response message is used to configure the SLRB configuration information corresponding to the QoS flow; after a radio resource control (RRC) layer at the transmitting terminal receives the SLRB configuration information, if the SLRB configuration information carries the SDAP configuration information of the sidelink communication interface, establishing an SDAP entity corresponding to the SDAP configuration information, or if the SLRB configuration message carries the SDAP configuration information of the sidelink communication interface and the SDAP entity corresponding to the SDAP configuration information is not established, establishing the SDAP entity corresponding to the SDAP configuration information.

Optionally, maintaining the SDAP entity based on a destination identifier includes: transmitting second request information to a network device, wherein the second request information is used to request to obtain SLRB configuration information corresponding to a QoS flow associated with a fourth destination ID; receiving a second response message fed back by the network device, wherein the second response message is used to configure the SLRB configuration information corresponding to the QoS flow; after a radio resource control (RRC) layer at the transmitting terminal obtains the SLRB configuration information, if the sidelink communication destination ID corresponding to the SLRB configuration information does not have a corresponding SDAP entity, establishing the corresponding SDAP entity.

Optionally, maintaining the SDAP entity based on a destination identifier includes: establishing the SDAP entity based on implementation of the transmitting terminal.

Optionally, maintaining the SDAP entity based on a destination identifier includes at least one of the following: if a radio link failure (RLF) occurs on a sidelink communication interface of the transmitting terminal, releasing SDAP entities corresponding to all destination identifiers of the sidelink communication interface;

if a unicast connection release is applied to the sidelink communication interface of the transmitting terminal, releasing SDAP entities corresponding to all destination identifiers corresponding to the unicast connection; if all sidelink communication interface radio bearer SLRBs corresponding to an SDAP entity corresponding to a fifth destination ID of the transmitting terminal are released, releasing the SDAP entity corresponding to the fifth destination ID; if the transmitting terminal implements a state change, releasing the SDAP entities corresponding to all destination identifiers of the transmitting terminal; releasing an SDAP entity corresponding to a sixth destination ID according to an instruction from a high layer; releasing an SDAP entity corresponding to a seventh destination ID based on implementation of the transmitting terminal.

Optionally, if the transmitting terminal implements a state change, releasing the SDAP entities corresponding to all destination identifiers of the transmitting terminal includes: if the transmitting terminal implements a state change, after receiving SLRB configuration information of a sidelink communication radio interface after the state change, releasing the SDAP entities corresponding to all destination identifiers of the transmitting terminal; or, if the transmitting terminal implements the state change, starting a first timer, and after the first timer expires, releasing the SDAP entities corresponding to all destination identifiers of the transmitting terminal.

Optionally, after receiving the SLRB configuration information of the sidelink communication radio interface after the state change, the SDAP entity maintenance method further includes: notifying a sidelink communication receiving terminal to release the SDAP entities corresponding to all destination identifiers of the transmitting terminal.

Optionally, if the transmitting terminal implements a state change, after releasing the SDAP entities corresponding to all destination identifiers of the transmitting terminal, the SDAP entity maintenance method further includes: establishing the SDAP entity according to the SLRB configuration information after the state change.

Optionally, establishing the SDAP entity according to SLRB configuration information after the state change includes at least one of the following:
  if the transmitting terminal changes from a radio resource control connected state to a radio resource control idle state or a radio resource control inactive state, establishing the SDAP entity according to SDAP configuration in SLRB configuration information configured in broadcast; if the transmitting terminal changes from the radio resource control connected state to an offline state, establishing the SDAP entity according to SLRB configuration information configured in pre-configuration information; if the transmitting terminal changes from the radio resource control idle state, the radio resource control inactive state or the offline state to the radio resource control connected state, establishing the SDAP entity according to SDAP configuration in SLRB configuration information configured in a destination signaling.

Optionally, maintaining the SDAP entity based on a destination identifier includes at least one of the following: if newly added or modified SLRB configuration information includes SDAP configuration information corresponding to an eighth destination ID, reconfiguring the SDAP entity; if the transmitting terminal implements a state change, reconfiguring the SDAP entity according to destination SDAP configuration information corresponding to a ninth destination ID.

Optionally, if the transmitting terminal implements a state change, reconfiguring the SDAP entity according to destination SDAP configuration information corresponding to a ninth destination ID includes: if the transmitting terminal implements the state change, and SDAP configuration corresponding to the ninth destination ID corresponding to the sidelink communication interface radio bearer (SLRB) before and after the change are different, determining destination SDAP configuration information; reconfiguring the SDAP entity corresponding to the ninth destination ID according to the destination SDAP configuration information.

Optionally, if the transmitting terminal implements the state change, and SDAP configuration corresponding to the ninth destination ID corresponding to the sidelink communication interface radio bearer (SLRB) before and after the change are different, determining destination SDAP configuration information includes at least one of the following: if the transmitting terminal changes from a radio resource control connected state to a radio resource control idle state or a radio resource control inactive state and SDAP configuration corresponding to the SLRB in the radio resource control connected state is different from SDAP configuration in the radio resource control idle state or the radio resource control inactive state, determining that the SDAP configuration information corresponding to the ninth destination ID configured in broadcast is the destination SDAP configuration information; if the transmitting terminal changes from the radio resource control connected state to an offline state and the SDAP configuration corresponding to the SLRB in the radio resource control connected state is different from the SDAP configuration pre-configured in the offline state, determining that the SDAP configuration information corresponding to the ninth destination ID in the pre-configuration information is the destination SDAP configuration information; if the transmitting terminal changes from the radio resource control idle state, the radio resource control inactive state or the offline state to the radio resource control connected state and the SDAP configuration corresponding to the SLRB in the radio resource control idle state, the radio resource control inactive state, or the offline state is different from the SDAP configuration in the radio resource control connected state, determining that the SDAP configuration information corresponding to the ninth destination ID in a destination signaling is the destination SDAP configuration information.

Optionally, a communication type corresponding to the cast type includes: broadcast communication of the sidelink communication interface, multicast communication of the sidelink communication interface, or unicast communication of the sidelink communication interface.

An embodiment of the present disclosure provides an SDAP entity maintenance method, applied to a receiving terminal, including: maintaining the SDAP entity based on a destination identifier; wherein, the destination identifier includes: a sidelink communication destination ID; or the destination identifier includes: a combination of a sidelink communication source ID and the sidelink communication destination ID; or the destination identifier includes: a combination of the sidelink communication destination ID and a cast type; or the destination identifier includes: a combination of the sidelink communication source ID, the sidelink communication destination ID, and the cast type; or the destination identifier includes: a user ID of the receiving terminal.

Optionally, maintaining the SDAP entity based on a destination identifier includes at least one of the following: for sidelink communication interface unicast communication, receiving a first message sent by a sidelink communication opposite terminal for performing sidelink communication interface radio bearer (SLRB) configuration, if the first message includes SDAP configuration corresponding to a first destination ID and an SDAP entity corresponding to the SDAP configuration does not exist at the receiving terminal, establishing an SDAP entity corresponding to the SDAP configuration; for the sidelink communication interface unicast communication, receiving a second message sent by the sidelink communication opposite terminal for performing the sidelink communication interface radio bearer (SLRB) configuration, and a second destination ID corresponding to the SLRB does not have a corresponding SDAP entity, establishing the corresponding SDAP entity; for the sidelink communication interface radio bearer (SLRB), if a third destination ID corresponding a the radio link control (RLC) entity and/or a packet data convergence protocol (PDCP) entity corresponding to the SLRB does not have a corresponding SDAP entity, establishing the corresponding SDAP entity; if a first PDCP entity or a first RLC entity corresponding to a fourth destination ID is established, establishing an SDAP entity corresponding to the fourth destination ID; establishing an SDAP entity corresponding to a fifth destination ID based on implementation of the receiving terminal; if a first data packet corresponding to a sixth destination ID is received, establishing an SDAP entity corresponding to the sixth destination ID.

Optionally, maintaining the SDAP entity based on a destination identifier includes at least one of the following: for sidelink communication interface unicast communication, receiving a sidelink communication interface unicast connection release message and releasing SDAP entities corresponding to all destination identifiers of the unicast connection, the sidelink communication interface unicast connection including: sidelink communication interface radio resource control (PC5-RRC) connection or sidelink communication interface signaling protocol layer (PC5-S) connection; if all sidelink communication interface radio bearer (SLRBs) corresponding to an SDAP entity corresponding to a seventh destination ID are released, releasing the SDAP entity corresponding to the seventh destination ID; if a PDCP entity or a RLC entity corresponding to an SDAP entity corresponding to an eighth destination ID is released, releasing the SDAP entity corresponding to the eighth destination ID; for a destination communication mode, if the receiving terminal implements a state change, releasing SDAP entities corresponding to all destination identifiers in the destination communication mode, wherein the destination communication mode includes broadcast communication or multicast communication.

Optionally, if the receiving terminal implements a state change, releasing SDAP entities corresponding to all destination identifiers in the destination communication mode includes: if the receiving terminal implements a state change, after receiving the SLRB configuration information of a sidelink communication radio interface after the state change, releasing the SDAP entities corresponding to all destination identifiers in the destination communication mode; or if the receiving terminal implements a state change, starting a second timer, and after the second timer expires, releasing the SDAP entities corresponding to all destination identifiers in the destination communication mode.

Optionally, if the receiving terminal implements a state change, after releasing SDAP entities corresponding to all destination identifiers in the destination communication mode, the method further includes: if the receiving terminal implements the state change and SDAP configuration before the state change is inconsistent with SDAP configuration after the state change, determining destination SDAP configuration information; establishing a corresponding SDAP entity according to the destination SDAP configuration information.

Optionally, maintaining the SDAP entity based on a destination identifier includes: for sidelink communication interface unicast, if the SLRB configuration information corresponding to newly added or modified sidelink communication interface radio bearer (SLRB) includes SDAP configuration information corresponding to a ninth destination ID, reconfiguring the SDAP entity corresponding to the ninth destination ID.

Optionally, if the receiving terminal implements the state change and SDAP configuration before the state change is inconsistent with SDAP configuration after the state change, determining destination SDAP configuration information includes at least one of: the receiving terminal changing from an online state to an offline state, and SDAP configuration configured by a network in the online state being inconsistent with SDAP configuration pre-configured in the offline state, determining that the SDAP configuration information in pre-configuration information is the destination SDAP configuration information; the receiving terminal changing from the offline state to the online state, and the SDAP configuration pre-configured in the offline state being inconsistent with the SDAP configuration configured by the network in the online state, determining that the SDAP configuration information configured by the network is the destination SDAP configuration information.

Optionally, the online state includes: at least one of a radio resource control connected state, a radio resource control idle state, or a radio resource control inactive state.

Optionally, a communication type corresponding to a cast type includes: broadcast communication of the sidelink communication interface, multicast communication of the sidelink communication interface, or unicast communication of the sidelink communication interface.

An embodiment of the present disclosure provides a transmitting terminal, including: a memory, a processor, and a program stored on the memory and executed by the processor; wherein the processor executes the program to implement the following steps: maintaining the SDAP entity based on a destination identifier; wherein, the destination identifier includes: a sidelink communication destination ID; or the destination identifier includes: a combination of a sidelink communication source ID and the sidelink communication destination ID; or the destination identifier includes: a combination of the sidelink communication destination ID and a cast type; or the destination identifier includes: a combination of the sidelink communication source ID, the sidelink communication destination ID, and the cast type; or the destination identifier includes: a user ID of the transmitting terminal.

Optionally, the processor executes the program of maintaining the SDAP entity based on a destination identifier to implement the following step: receiving an establishment request or an establishment message of a first Quality of Service (QoS) flow associated with a first destination ID, and establishing an SDAP entity corresponding to the first destination ID.

Optionally, the processor executes the program of maintaining the SDAP entity based on a destination identifier to implement the following step: receiving a first data packet of a QoS flow associated with a second destination ID, and establishing an SDAP entity corresponding to the second destination ID.

Optionally, the processor executes the program of maintaining the SDAP entity based on a destination identifier to implement the following step: establishing a radio link control (RLC) entity and/or a packet data convergence protocol (PDCP) entity corresponding to a sidelink communication interface radio bearer, if a destination identifier corresponding to the RLC entity and/or the PDCP entity does not have a corresponding SDAP entity, establishing the corresponding SDAP entity.

Optionally, the processor executes the program of maintaining the SDAP entity based on a destination identifier to implement the following steps: transmitting first request information to a network device, wherein the first request information is used to request to obtain sidelink communication interface radio bearer (SLRB) configuration information corresponding to a QoS flow associated with a third destination ID; receiving a first response message fed back by the network device, wherein the first response message is used to configure the SLRB configuration information corresponding to the QoS flow; after a radio resource control (RRC) layer at the transmitting terminal receives the SLRB configuration information, if the SLRB configuration information carries the SDAP configuration information of the sidelink communication interface, establishing an SDAP entity corresponding to the SDAP configuration information, or if the SLRB configuration message carries the SDAP configuration information of the sidelink communication interface and the SDAP entity corresponding to the SDAP configuration information is not established, establishing the SDAP entity corresponding to the SDAP configuration information.

Optionally, the processor executes the program of maintaining the SDAP entity based on a destination identifier to implement the following steps: transmitting second request information to a network device, wherein the second request information is used to request to obtain SLRB configuration information corresponding to a QoS flow associated with a fourth destination ID; receiving a second response message fed back by the network device, wherein the second response message is used to configure the SLRB configuration information corresponding to the QoS flow; after a radio resource control (RRC) layer at the transmitting terminal obtains the SLRB configuration information, if the sidelink communication destination ID corresponding to the SLRB configuration information does not have a corresponding SDAP entity, establishing the corresponding SDAP entity.

Optionally, the processor executes the program of maintaining the SDAP entity based on a destination identifier to implement the following step: establishing the SDAP entity based on implementation of the transmitting terminal.

Optionally, the processor executes the program of maintaining the SDAP entity based on a destination identifier to implement the following steps: if a radio link failure (RLF) occurs on a sidelink communication interface of the transmitting terminal, releasing SDAP entities corresponding to all destination identifiers of the sidelink communication interface; if a unicast connection release is applied to the sidelink communication interface of the transmitting terminal, releasing SDAP entities corresponding to all destination identifiers corresponding to the unicast connection; if all sidelink communication interface radio bearer SLRBs corresponding to an SDAP entity corresponding to a fifth destination ID of the transmitting terminal are released, releasing the SDAP entity corresponding to the fifth destination ID; if the transmitting terminal implements a state change, releasing the SDAP entities corresponding to all destination identifiers of the transmitting terminal; releasing an SDAP entity corresponding to a sixth destination ID according to an instruction from a high layer; releasing an SDAP entity corresponding to a seventh destination ID based on implementation of the transmitting terminal.

Optionally, when the processor executes the program of if the transmitting terminal implements a state change, releasing the SDAP entities corresponding to all destination identifiers of the transmitting terminal, to implement the following steps: if the transmitting terminal implements a state change, after receiving SLRB configuration information of a sidelink communication radio interface after the state change, releasing the SDAP entities corresponding to all destination identifiers of the transmitting terminal; or if the transmitting terminal implements the state change, starting a first timer, and after the first timer expires, releasing the SDAP entities corresponding to all destination identifiers of the transmitting terminal.

Optionally, after receiving the SLRB configuration information of the sidelink communication radio interface after the state change, the processor further executes the program to implement the following step: notifying a sidelink communication receiving terminal to release the SDAP entities corresponding to all destination identifiers of the transmitting terminal.

Optionally, if the transmitting terminal implements a state change, after releasing the SDAP entities corresponding to all destination identifiers of the transmitting terminal, the processor further executes the program to achieve the following step: establishing the SDAP entity according to the SLRB configuration information after the state change.

Optionally, the processor executes the program of establishing the SDAP entity SLRB configuration information after the state change to implement the following steps: if the transmitting terminal changes from a radio resource control connected state to a radio resource control idle state or a radio resource control inactive state, establishing the SDAP entity according to SDAP configuration in SLRB configuration information configured in broadcast; if the transmitting terminal changes from the radio resource control connected state to an offline state, establishing the SDAP entity according to SLRB configuration information configured in pre-configuration information; if the transmitting terminal changes from the radio resource control idle state, the radio resource control inactive state or the offline state to the radio resource control connected state, establishing the SDAP entity according to SDAP configuration in SLRB configuration information configured in a destination signaling.

Optionally, the processor executes the program of maintaining the SDAP entity based on a destination identifier to implement the following steps: if newly added or modified SLRB configuration information includes SDAP configuration information corresponding to an eighth destination ID, reconfiguring the SDAP entity; if the transmitting terminal implements a state change, reconfiguring the SDAP entity according to destination SDAP configuration information corresponding to a ninth destination ID.

Optionally, the processor performs the program of if the transmitting terminal implements a state change, reconfiguring the SDAP entity according to destination SDAP configuration information corresponding to a ninth destination ID, to implement the following steps: if the transmitting terminal implements the state change, and SDAP configuration corresponding to the ninth destination ID corresponding to the sidelink communication interface radio bearer (SLRB) before and after the change are different, determining destination SDAP configuration information; reconfiguring the SDAP entity corresponding to the ninth destination ID according to the destination SDAP configuration information.

Optionally, the processor executes the program of if the transmitting terminal implements the state change, and SDAP configuration corresponding to the ninth destination ID corresponding to the sidelink communication interface radio bearer (SLRB) before and after the change are different, determining destination SDAP configuration information, to implement at least one of the following: if the transmitting terminal changes from a radio resource control connected state to a radio resource control idle state or a radio resource control inactive state and SDAP configuration corresponding to the SLRB in the radio resource control connected state is different from SDAP configuration in the radio resource control idle state or the radio resource control inactive state, determining that the SDAP configuration information corresponding to the ninth destination ID configured in broadcast is the destination SDAP configuration information; if the transmitting terminal changes from the radio resource control connected state to an offline state and the SDAP configuration corresponding to the SLRB in the radio resource control connected state is different from the SDAP configuration pre-configured in the offline state, determining that the SDAP configuration information corresponding to the ninth destination ID in the pre-configuration information is the destination SDAP configuration information; if the transmitting terminal changes from the radio resource control idle state, the radio resource control inactive state or the offline state to the radio resource control connected state and the SDAP configuration corresponding to the SLRB in the radio resource control idle state, the radio resource control inactive state, or the offline state is different from the SDAP configuration in the radio resource control connected state, determining that the SDAP configuration information corresponding to the ninth destination ID in a destination signaling is the destination SDAP configuration information.

Optionally, a communication type corresponding to the cast type includes: broadcast communication of a sidelink communication interface, multicast communication of a sidelink communication interface, or unicast communication of a sidelink communication interface.

An embodiment of the present disclosure provides a receiving terminal, including: a memory, a processor, and a program stored on the memory and executed by the processor; wherein, the processor executes the program to implement the following step: maintaining the SDAP entity based on a destination identifier; wherein, the destination identifier includes: a sidelink communication destination ID; or the destination identifier includes: a combination of a sidelink communication source ID and the sidelink communication destination ID; or the destination identifier includes: a combination of the sidelink communication destination ID and a cast type; or the destination identifier includes: a combination of the sidelink communication source ID, the sidelink communication destination ID, and the cast type; or the destination identifier includes: a user ID of the receiving terminal.

Optionally, the processor executes the program of maintaining the SDAP entity based on a destination identifier to implement the following steps: for sidelink communication interface unicast communication, receiving a first message sent by a sidelink communication opposite terminal for performing sidelink communication interface radio bearer (SLRB) configuration, if the first message includes SDAP configuration corresponding to a first destination ID and an SDAP entity corresponding to the SDAP configuration does not exist at the receiving terminal, establishing an SDAP entity corresponding to the SDAP configuration; for the sidelink communication interface unicast communication, receiving a second message sent by the sidelink communication opposite terminal for performing the sidelink communication interface radio bearer (SLRB) configuration, and a second destination ID corresponding to the SLRB does not have a corresponding SDAP entity, establishing the corresponding SDAP entity; for the sidelink communication interface radio bearer (SLRB), if a third destination ID corresponding a the radio link control (RLC) entity and/or a packet data convergence protocol (PDCP) entity corresponding to the SLRB does not have a corresponding SDAP entity, establishing the corresponding SDAP entity; if a first PDCP entity or a first RLC entity corresponding to a fourth destination ID is established, establishing an SDAP entity corresponding to the fourth destination ID; establishing an SDAP entity corresponding to a fifth destination ID based on implementation of the receiving terminal; if a first data packet corresponding to a sixth destination ID is received, establishing an SDAP entity corresponding to the sixth destination ID.

Optionally, the processor executes the program of maintaining the SDAP entity based on a destination identifier to implement the following steps: for sidelink communication interface unicast communication, receiving a sidelink communication interface unicast connection release message and releasing SDAP entities corresponding to all destination identifiers of the unicast connection, the sidelink communication interface unicast connection including: sidelink communication interface radio resource control (PC5-RRC) connection or sidelink communication interface signaling protocol layer (PC5-S) connection; if all sidelink communication interface radio bearer (SLRBs) corresponding to an SDAP entity corresponding to a seventh destination ID are released, releasing the SDAP entity corresponding to the seventh destination ID; if a PDCP entity or a RLC entity corresponding to an SDAP entity corresponding to an eighth destination ID is released, releasing the SDAP entity corresponding to the eighth destination ID; for a destination communication mode, if the receiving terminal implements a state change, releasing SDAP entities corresponding to all destination identifiers in the destination communication mode, wherein the destination communication mode includes broadcast communication or multi cast communication.

Optionally, when the processor executes the program of if the receiving terminal implements a state change, releasing SDAP entities corresponding to all destination identifiers in the destination communication mode, to implement the following steps: if the receiving terminal implements a state change, after receiving the SLRB configuration information of a sidelink communication radio interface after the state change, releasing the SDAP entities corresponding to all destination identifiers in the destination communication mode; or if the receiving terminal implements a state change, starting a second timer, and after the second timer expires, releasing the SDAP entities corresponding to all destination identifiers in the destination communication mode.

Optionally, the processor executes the program of if the receiving terminal implements a state change, after releasing SDAP entities corresponding to all destination identifiers in the destination communication mode, to implement the following steps: if the receiving terminal implements the state change and SDAP configuration before the state change is inconsistent with SDAP configuration after the state change, determining destination SDAP configuration information; establishing a corresponding SDAP entity according to the destination SDAP configuration information.

Optionally, the processor executes the program of maintaining the SDAP entity based on a destination identifier to implement the following step: for sidelink communication interface unicast, if the SLRB configuration information corresponding to newly added or modified sidelink communication interface radio bearer (SLRB) includes SDAP configuration information corresponding to a ninth destination ID, reconfiguring the SDAP entity corresponding to the ninth destination ID.

Optionally, the processor executes the program of if the receiving terminal implements the state change and SDAP configuration before the state change is inconsistent with SDAP configuration after the state change, determining destination SDAP configuration information, to implement at least one of the following steps: the receiving terminal changing from an online state to an offline state, and SDAP configuration configured by a network in the online state being inconsistent with SDAP configuration pre-configured in the offline state, determining that the SDAP configuration information in pre-configuration information is the destination SDAP configuration information; the receiving terminal changing from the offline state to the online state, and the SDAP configuration pre-configured in the offline state being inconsistent with the SDAP configuration configured by the network in the online state, determining that the SDAP configuration information configured by the network is the destination SDAP configuration information.

Optionally, the online state includes: at least one of a radio resource control connected state, a radio resource control idle state, or a radio resource control inactive state.

Optionally, a communication type corresponding to the cast type includes: broadcast communication of the sidelink communication interface, multicast communication of the sidelink communication interface, or unicast communication of the sidelink communication interface.

An embodiment of the present disclosure provides a computer-readable storage medium having a computer program stored thereon, wherein the computer program, when executed by a processor, implements the SDAP entity maintenance method applied to the transmitting terminal.

An embodiment of the present disclosure provides a transmitting terminal, including: a first maintenance module, configured to maintain the SDAP entity based on a destination identifier; wherein, the destination identifier includes: a sidelink communication destination ID; or the destination identifier includes: a combination of a sidelink communication source ID and the sidelink communication destination ID.

An embodiment of the present disclosure provides a receiving terminal, including: a second maintenance module, configured to maintain the SDAP entity based on a destination identifier; wherein, the destination identifier includes: a sidelink communication destination ID; or the destination identifier includes: a combination of a sidelink communication source ID and the sidelink communication destination ID.

The beneficial effect of the present disclosure is as follows.

In the above solution, the SDAP entity is maintained based on the destination identifier so that the SDAP entity is accurately maintained and the reliability of communication service in NR V2X can be guaranteed.

BRIEF DESCRIPTION OF THE DRAWINGS

In order to explain the technical solutions of the embodiments of the present disclosure more clearly, the following will briefly introduce the drawings that need to be used in the description of the embodiments of the present disclosure. Obviously, the drawings in the following description are only some embodiments of the present disclosure. For those of ordinary skill in the art, other drawings can be obtained based on these drawings without creative work.

FIG. 3 shows a schematic diagram of a Uu interface SDAP structure;

FIG. 4 shows a schematic flowchart of an SDAP entity maintenance method applied to a transmitting terminal according to an embodiment of the present disclosure;

FIG. 5 shows a schematic diagram of modules of the transmitting terminal according to an embodiment of the present disclosure;

DETAILED DESCRIPTION

In order to make the technical problem, technical solution, and advantage to be solved by the present disclosure clearer, a detailed description will be given below in conjunction with the accompanying drawings and specific embodiments.

First, some concepts mentioned in the embodiments of the present disclosure are described as follows.

1. Introduction to V2X

Figure 1:
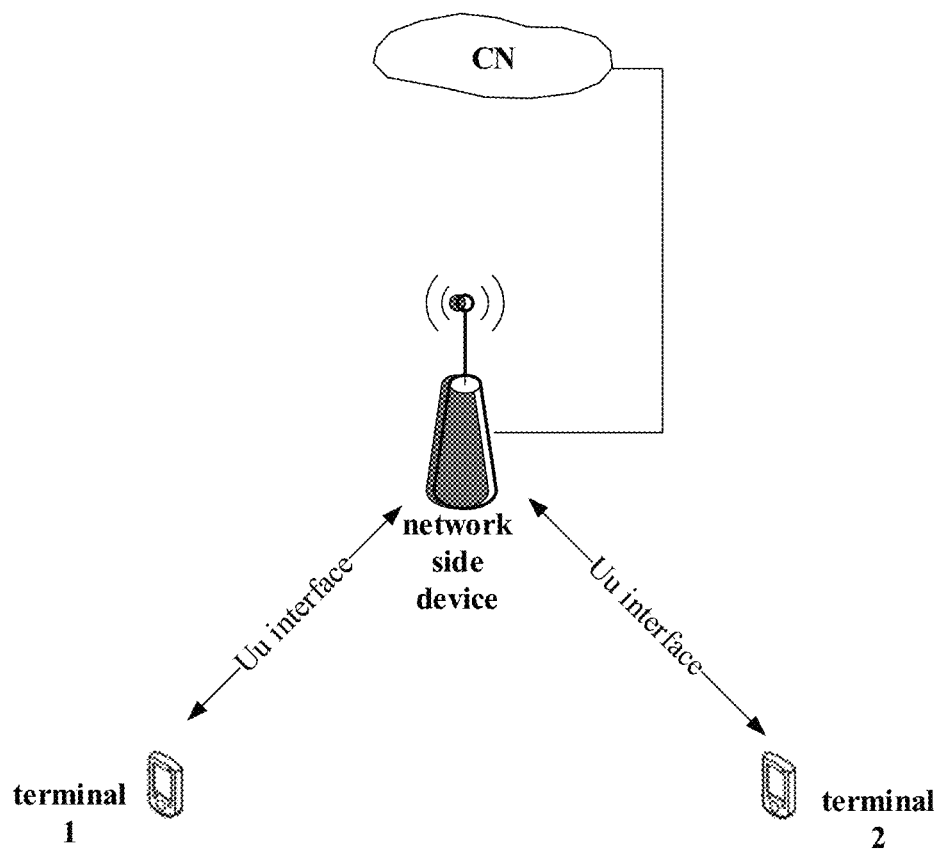
FIG. 1 shows a schematic diagram of cellular network communication.

The wireless communication in the related art adopts the cellular network communication mode, that is, the terminal and the network device transmit uplink and downlink data/control information through an interface (the Uu interface) between the terminal and the network, as shown in FIG. 1.

Figure 2:
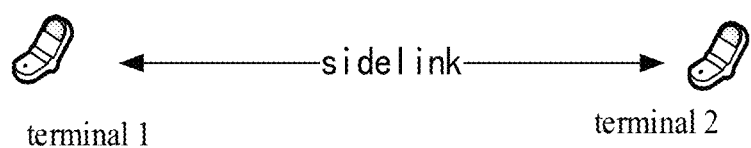
FIG. 2 shows a schematic diagram of sidelink communication.

Sidelink communication refers that neighboring terminals can transmit data through a sidelink communication link (also called Sidelink) within a short range. The wireless interface corresponding to Sidelink is called a sidelink communication interface, also called a Sidelink interface, as shown in FIG. 2.

V2X data can be transmitted through the Uu interface or through the Sidelink interface. The specific interface used for transmission is determined by high layer.

2. SDAP Entity Maintenance of the Uu Interface

The SDAP structure of the Uu interface is shown in FIG. 3. The SDAP entity maintenance of the Uu interface is based on the PDU session. One PDU session corresponds to one SDAP entity.

Although it is currently clear that NR V2X needs to support the SDAP protocol layer, there is no relevant solution for how to perform SDAP entity maintenance (establishment/release, etc.). The embodiments of the present disclosure address this problem and provide an SDAP entity maintenance method, a transmitting terminal and a receiving terminal.

As shown in FIG. 4, the SDAP entity maintenance method of the embodiment of the present disclosure, applied to the transmitting terminal, includes:

Step 41: maintaining an SDAP entity based on a destination identifier;

It should be noted that the destination identifier adopts one of the following situations:

X11. The destination ID includes: a sidelink communication destination ID;

X12. The destination ID includes: a combination of a sidelink communication source ID and a sidelink communication destination ID;

It should be noted that the sidelink communication destination ID is usually used to distinguish services, that is, different sidelink communication destination IDs correspond to different services. In the access network, the sidelink communication destination ID can also be called Destination Layer-2 ID. The sidelink communication source ID refers to the user ID of the transmitting terminal of the sidelink communication (in this embodiment, the sidelink communication source ID is the user ID of the transmitting terminal itself). In the access network, the sidelink communication source ID also be called Source Layer-2 ID.

X13. The destination ID includes: a combination of a sidelink communication destination ID and a cast type;

It should be noted that the communication type corresponding to the cast type includes: broadcast communication of the sidelink communication interface, multicast communication of the sidelink communication interface, or unicast communication of the sidelink communication interface.

X14. The destination ID includes: a combination of the sidelink communication source ID, the sidelink communication destination ID, and the cast type;

X15. The destination ID includes: a user ID of the transmitting terminal;

It should be noted that in this case, the user ID of the transmitting terminal is used as the destination identifier. Since one transmitting terminal has only one user ID, in this case, there is only one SDAP entity for one transmitting terminal.

The maintenance of the SDAP entity in the embodiments of the present disclosure mainly includes: establishment of the SDAP entity, release of the SDAP entity, and reconfiguration of the SDAP entity. The specific implementation of the embodiments of the present disclosure are described in detail from these three aspects as follows.

1. Establishment of the SDAP Entity

The establishment of the SDAP entity mainly includes one of the following:

A11. Establishment of the SDAP entity triggered by a quality of service (QoS) flow The specific implementation in this case is: receiving an establishment request or an establishment message of a first QoS flow associated with a first destination ID, and establishing an SDAP entity corresponding to the first destination ID.

It should be noted that the first destination ID refers to any sidelink communication destination ID, or a combination of any sidelink communication destination ID and any sidelink communication source ID, that is, as long as the transmitting terminal receives the establishment request or establishment message of the first QoS flow associated with destination ID, the transmitting terminal needs to establish the SDAP entity corresponding to the first destination ID.

A12. Establishment of the SDAP entity triggered by a data packet

The specific implementation in this case is: receiving a first data packet of a QoS flow associated with a second destination ID, and establishing an SDAP entity corresponding to the second destination ID.

It should be noted that the second destination ID refers to any sidelink communication destination ID, or a combination of any sidelink communication destination ID and any sidelink communication source ID, that is, the transmitting terminal receives the first data packet of the QoS flow associated with the destination identifier, it needs to establish the SDAP entity corresponding to the sidelink communication destination ID.

A13. The establishment of the SDAP entity triggered by a radio link control (RLC) entity and/or a packet data convergence protocol (PDCP) entity The specific implementation in this case is: establishing a radio link control RLC entity and/or a packet data convergence protocol PDCP entity corresponding to a sidelink communication interface radio bearer (SLRB), if a destination identifier corresponding to the RLC entity and/or the PDCP entity does not have a corresponding SDAP entity, establishing the corresponding SDAP entity.

In this case, after the RLC entity corresponding to the SLRB is established, if the transmitting terminal determines that the sidelink communication destination ID (or the combination of the sidelink communication destination ID and the sidelink communication source ID) corresponding to the established RLC entity does not have a corresponding SDAP entity, the transmitting terminal establishes the SDAP entity corresponding to the sidelink communication destination ID (or the combination of the sidelink communication destination ID and the sidelink communication source ID) corresponding to the RLC entity; or, when the PDCP entity corresponding to the SLRB is established, if the transmitting terminal determines that the sidelink communication destination ID (or the combination of the sidelink communication destination ID and the sidelink communication source ID) corresponding to the established PDCP entity does not have a corresponding SDAP entity, and the transmitting terminal establishes the corresponding SDAP entity corresponding to the sidelink communication destination ID (or the sidelink communication destination ID and the sidelink communication destination ID) corresponding to the PDCP entity; or, after the RLC entity and the PDCP entity corresponding to the SLRB are established, if the transmitting terminal determines that the sidelink communication destination ID (or the combination of the sidelink communication destination ID and the sidelink communication source ID) corresponding to the established RLC entity and PDCP entity does not have a corresponding SDAP entity, and the transmitting terminal establishes the corresponding SDAP entity corresponding to the sidelink communication destination ID (or the sidelink communication destination ID and the sidelink communication destination ID) corresponding to the RLC entity and PDCP entity A14. Establishment of the SDAP entity according to SDAP configuration information in SLRB configuration The specific implementation in this case is: transmitting first request information to a network device, wherein the first request information is used to request to obtain sidelink communication interface radio bearer SLRB configuration information corresponding to a QoS flow associated with a third destination ID; receiving a first response message fed back by the network device, wherein the first response message is used to configure SLRB configuration information corresponding to the QoS flow; after a radio resource control RRC layer at the transmitting terminal receives the SLRB configuration information, if the SLRB configuration information carries the SDAP configuration information of the sidelink communication interface, establishing the SDAP entity corresponding to the SDAP configuration information, or if the SLRB configuration message carries the SDAP configuration information of the sidelink communication interface and the SDAP entity corresponding to the SDAP configuration information is not established, establishing the SDAP entity corresponding to the SDAP configuration information.

It should be noted that the third destination ID refers to any sidelink communication destination ID, or a combination of any sidelink communication destination ID and any sidelink communication source ID; that is, when the transmitting terminal obtains a QoS flow of a destination identifier, the SLRB configuration information corresponding to the QoS flow needs to be obtained, that is, the request information will be sent to the network device, and the network device will feed back a response message according to the request information sent by the transmitting terminal. The response message is used to configure the SLRB configuration information corresponding to the QoS flow, if the SLRB configuration information includes SDAP configuration information, the transmitting terminal establishes an SDAP entity corresponding to the SDAP configuration information. In this case, as long as the SLRB configuration information includes SDAP configuration information, the transmitting terminal establishes the SDAP entity corresponding to the SDAP configuration information; or, when the SLRB configuration information includes the SDAP configuration information, the transmitting terminal does not sidelinkly establish the corresponding SDAP entity according to the SDAP configuration information, only when the transmitting terminal determines that the SDAP entity corresponding to the SDAP configuration information has not been established, the transmitting terminal establishes the corresponding SDAP entity.

A15. The transmitting terminal receives the SLRB configuration and establishes the SDAP entity The specific implementation in this case is: transmitting second request information to the network device, wherein the second request information is used to request to obtain sidelink communication interface radio bearer SLRB configuration information corresponding to a QoS flow associated with a fourth destination ID; receiving a second response message fed back by the network device, wherein the second response message is used to configure SLRB configuration information corresponding to the QoS flow; after a radio resource control RRC layer of the transmitting terminal obtains the SLRB configuration information, if the sidelink communication destination ID corresponding to the SLRB configuration information does not have a corresponding SDAP entity, establishing the corresponding SDAP entity.

It should be noted that the fourth destination ID refers to any sidelink communication destination ID, or a combination of any sidelink communication destination ID and any sidelink communication source ID; that is, when the transmitting terminal obtains a QoS flow of a destination identifier, the SLRB configuration information corresponding to the QoS flow needs to be obtained, that is to say, request information is sent to the network device, and the network device feeds back a response message according to the request information, and the response message is used to configure the SLRB configuration information corresponding to the QoS flow, when the transmitting terminal obtains the SLRB configuration information, if the sidelink communication destination ID corresponding to the SLRB configuration information does not have a corresponding SDAP entity, the SDAP entity corresponding to the SDAP configuration information is established, In this case, the SLRB configuration information fed back by the network device usually does not carry the SDAP configuration information, that is, as long as the transmitting terminal does not establish the SDAP entity corresponding to the sidelink communication destination ID corresponding to the SLRB configuration information, it needs to establish a corresponding SDAP entity.

It should be noted that the above A14 and A15 both establish the SDAP entity based on the feedback of the network device. The difference is that in A14, the SDAP entity is established based on the SDAP configuration information fed back by the network device, while in A15, the network device does not feedback the SDAP configuration. In this case, the terminal will establish the SDAP entity based on the SLRB configuration information.

It should be noted that the above-mentioned A11-A15 are specific implementations, and the transmitting terminal may establish an SDAP entity at an appropriate time according to the entity establishment method described in any of the above.

A16. The establishment of the SDAP entity based on the implementation of the transmitting terminal;

It should be noted that, in this case, the timing of establishing the SDAP entity is determined according to the implementation of the transmitting terminal, and the above A11-A15 can be regarded as the specific implementation of the transmitting terminal.

2. Release of the SDAP Entity

The release method of the SDAP entity mainly includes at least one of the following:

A21. If a radio link failure (RLF) occurs on the sidelink communication interface of the transmitting terminal, releasing SDAP entities corresponding to all destination identifiers of the sidelink communication interface;

It should be noted that in this case, for the sidelink communication interface on which RLF occurs, the SDAP entities corresponding to all sidelink communication destination IDs (or the combination of all sidelink communication destination IDs and all sidelink communication source IDs) corresponding to the sidelink communication interface on which RLF occurs are released.

For example, one transmitting terminal (for example, UE1) and multiple receiving terminals (for example, UE2 and UE3) have sidelink communication interfaces. If RLF occurs on the sidelink communication interface between UE1 and UE2, only all SDAP entities corresponding to the sidelink communication interface between UE1 and UE2 need to be released. The SDAP entities corresponding to the sidelink communication interface between UE1 and UE3 do not need to be released.

A22. If a unicast connection release is applied to the sidelink communication interface of the transmitting terminal, releasing the SDAP entities corresponding to all destination identifiers corresponding to the unicast connection;

It should be noted that in this case, the SDAP entities corresponding to all sidelink communication destination IDs (or the combination of all sidelink communication destination IDs and all sidelink communication source IDs) corresponding to the unicast connection are released.

For example, if there is a unicast connection for a sidelink communication interface between the transmitting terminal (for example, UE1) and the receiving terminal (for example, UE2), once UE1 or UE2 determines to release the unicast connection between them, after UE1 sends or receives the unicast connection release request, all SDAP entities corresponding to the unicast connection need to be released.

A23. If all sidelink communication interface radio bearer SLRBs corresponding to an SDAP entity corresponding to a fifth destination ID of the transmitting terminal are released, releasing the SDAP entity corresponding to the fifth destination ID;

It should be noted that the fifth destination ID refers to any sidelink communication destination ID, or a combination of any sidelink communication destination ID and any sidelink communication source ID, that is, if all SLRBs corresponding to one SDAP entity are released, the transmitting terminal also needs to release the SDAP entity.

For example, if one SDAP entity corresponds to a plurality of SLRB entities, when the SLRB entity is released due to no data transmission requirements or other reasons, when the last SLRB entity is released, the SDAP entity also needs to be released.

A24. If the transmitting terminal implements a state change, releasing the SDAP entities corresponding to all destination identifiers of the transmitting terminal;

It should be noted that if there is a state change at the transmitting terminal, it is necessary to release the SDAP entities corresponding to all established sidelink communication destination IDs (or the combination of all sidelink communication destination IDs and all sidelink communication source IDs); the state change includes: a radio resource control connected state (RRC_CONNECTED) changed to an offline state; a radio resource control idle state (RRC_IDLE), a radio resource control inactive state (RRC_INACTIVE) or an offline state changed to a radio resource control connected state; a radio resource control idle state, a radio resource control inactive state or an offline state changed to an radio resource control connected state.

Further, the specific implementation of this situation includes one of the following:

A241. If the transmitting terminal implements a state change, after receiving the SLRB configuration information of the sidelink communication radio interface after the state change, releasing the SDAP entities corresponding to all destination identifiers of the transmitting terminal;

It should be noted that the SDAP entity is not released sidelinkly after the state is changed at the transmitting terminal. Only after the transmitting terminal receives the SLRB configuration information of the sidelink communication radio interface after the state change, the SDAP entity corresponding to all the destination identifiers at the transmitting terminal is released.

Optionally, after receiving the SLRB configuration information of the sidelink communication wireless interface after the state change, the transmitting terminal may also notify a sidelink communication receiving terminal to release the SDAP entities corresponding to all destination identities corresponding to the transmitting terminal.

A242. If the transmitting terminal implements a state change, starting a first timer, and after the first timer expires, releasing the SDAP entities corresponding to all destination identifiers of the transmitting terminal;

It should be noted that the SDAP entity is not released sidelinkly after the state is changed at the transmitting terminal, a timer (i.e. the first timer) is started first, and only after the timer expires, the SDAP entity corresponding to all destination identifiers corresponding to the transmitting terminal is released; the timing duration of the timer can be configured by the network side device, or it can be pre-configured.

Specifically, after the state is changed and the SDAP entity corresponding to all destination identifiers is released, the transmitting terminal also needs to reestablish the SDAP entity. The specific implementation method is: establishing the SDAP entity according to the SLRB configuration information after the state change.

It should be noted that, because there are many ways to change the state, the specific implementation of establishing the SDAP entity based on the SLRB configuration information after the state change will be different in different state change methods, specifically:

A241. The transmitting terminal changes from the radio resource control connected state to the radio resource control idle state or the radio resource control inactive state In this case, the specific implementation of establishing the SDAP entity according to the SLRB configuration information after the state change is: establishing the SDAP entity according to SDAP configuration in SLRB configuration information configured in broadcast.

A242. The transmitting terminal changes from the radio resource control connected state to an offline state In this case, the specific implementation of establishing the SDAP entity according to the SLRB configuration information after the state change is: establishing the SDAP entity according to SLRB configuration information configured in pre-configuration information.

A243. The transmitting terminal changes from the radio resource control idle state, the radio resource control inactive state or the offline state to the radio resource control connected state In this case, the specific implementation of establishing the SDAP entity according to the SLRB configuration information after the state change is: establishing the SDAP entity according to SDAP configuration in SLRB configuration information configured in a destination signaling.

It should be noted that the destination signaling refers to specific signaling, for example, dedicated signaling sent by a network device, and the dedicated signaling is used to configure the SLRB configuration information.

A25. Releasing an SDAP entity corresponding to a sixth destination ID according to an instruction of a high layer;

It should be noted that the sixth destination ID refers to the specific sidelink communication destination ID (or the specific sidelink communication destination ID and the specific sidelink communication source ID) indicated by the high layer. The high layer may be non-access network protocol layer, such as the V2X layer; it can also be the access network protocol layer, such as the radio resource control (RRC) layer. When the high layer notifies the SDAP protocol layer to release a specific SDAP entity, the SDAP protocol layer at the transmitting terminal will release the corresponding SDAP entity according to the notification from the high layer, that is, if the high layer instructs which SDAP entities to release, the SDAP entities will be released by the SDAP protocol layer.

For example, if the high layer instructs the transmitting terminal to switch the path from the sidelink communication interface to the Uu interface, the SDAP entity of the sidelink communication interface needs to be released.

A26. Releasing the SDAP entity corresponding to a seventh destination ID based on the implementation of the transmitting terminal;

It should be noted that the seventh destination ID refers to the specifically designated sidelink communication destination ID (or the designated sidelink communication destination ID and the designated sidelink communication source ID) in the implementation of the transmitting terminal; the release method in A21-A25 above can be regarded as the specific way of the implementation of the transmitting terminal.

3. Reconfiguration of the SDAP Entity

For SDAP entity reconfiguration methods, it mainly includes at least one of the following:

A31. If configuration information of newly added or modified sidelink communication interface radio bearer SLRB includes SDAP configuration information corresponding to an eighth destination ID, reconfiguring the SDAP entity.

It should be noted that the eighth destination ID refers to any sidelink communication destination ID, or a combination of any sidelink communication destination ID and any sidelink communication source ID; when configuration information of the newly added SLRB includes SDAP configuration information corresponding to any destination ID, the SDAP entity is reconfigured. When the reconfiguration is implemented, the SDAP entity reconfiguration is performed according to the SDAP configuration information corresponding to the destination identifier included in configuration information of the newly added SLRB; when the configuration information of the modified SLRB includes the SDAP configuration information corresponding to any destination ID, the SDAP entity is reconfigured. When performing the reconfiguration, the SDAP entity reconfiguration is performed according to the SDAP configuration information corresponding to the destination identifier included in the configuration information of the modified SLRB.

A32. If the transmitting terminal implements a state change, reconfiguring the SDAP entity according to destination SDAP configuration information corresponding to a ninth destination ID It should be noted that the ninth destination ID refers to any sidelink communication destination ID, or a combination of any sidelink communication destination ID and any sidelink communication source ID; when the state is changed, the transmitting terminal reconfiguring the SDAP entity is specifically implemented as follows: if the transmitting terminal changes the state, and SDAP configuration corresponding to the ninth destination ID corresponding to the sidelink communication interface radio bearer SLRB before and after the change are different, determining destination SDAP configuration information; reconfiguring the SDAP entity corresponding to the ninth destination ID according to the destination SDAP configuration information.

It should be noted that only when the SDAP configuration corresponding to the SLRB before and after the change are different, the SDAP entity needs to be reconfigured, so as to avoid unnecessary reconfiguration process and save the power consumption of the transmitting terminal.

It should be noted that the state change methods include: changing from the radio resource control connected state to the radio resource control idle state or the radio resource control inactive state, changing from the radio resource control connected state to the offline state; changing from the radio resource control idle state, the radio resource control inactive state or the offline state to the radio resource control connected state, the specific content of the destination SDAP configuration information corresponding to different state change methods are different. The following is how to determine the destination SDAP configuration information from the perspective of different state change methods.

A321. The transmitting terminal changes from the radio resource control connected state to the radio resource control idle state or the radio resource control inactive state Specifically, in this case, if SDAP configuration corresponding to the SLRB in the radio resource control connected state is different from SDAP configuration in the radio resource control idle state or the radio resource control inactive state, it is determined that the SDAP configuration information corresponding to the ninth destination ID configured in the broadcast is the destination SDAP configuration information.

A322, the transmitting terminal changes from the radio resource control connected state to the offline state Specifically, in this case, if the SDAP configuration corresponding to the SLRB in the radio resource control connected state is different from the SDAP configuration pre-configured in the offline state, it is determined that the SDAP configuration information corresponding to the ninth destination ID in the pre-configuration information is the destination SDAP configuration information.

A323, the transmitting terminal changes from the radio resource control idle state, the radio resource control inactive state or the offline state to the radio resource control connected state Specifically, in this case, if the SDAP configuration corresponding to the SLRB in the radio resource control idle state, the radio resource control inactive state, or the offline state is different from the SDAP configuration in the radio resource control connected state, it is determined that the SDAP configuration information corresponding to the ninth destination ID in destination signaling is destination SDAP configuration information.

It should be noted that the destination signaling refers to specific signaling, for example, dedicated signaling sent by a network device, and the dedicated signaling is used to configure SDAP configuration information.

It should be noted that the embodiments of the present disclosure can ensure that the transmitting terminal can accurately maintain the SDAP entity, and the reliability of the NR V2X communication service can be guaranteed.

As shown in FIG. 5, an embodiment of the present disclosure provides a transmitting terminal 50, including:

a first maintenance module 51, configured to maintain an SDAP entity based on a destination identifier;

Wherein, the destination identifier includes: a sidelink communication destination ID; or The destination ID includes: a combination of a sidelink communication source ID and a sidelink communication destination ID; or The destination ID includes: a combination of a sidelink communication destination ID and a cast type; or The destination ID includes: a combination of a sidelink communication source ID, a sidelink communication destination ID, and a cast type; or The destination ID includes: the user ID of the transmitting terminal.

Optionally, the first maintenance module 51 is configured to:
  receive an establishment request or an establishment message of a first QoS flow associated with a first destination ID, and establish an SDAP entity corresponding to the first destination ID.

Optionally, the first maintenance module 51 is configured to:
  receive a first data packet of a QoS flow associated with a second destination ID, and establish an SDAP entity corresponding to the second destination ID.

Optionally, the first maintenance module 51 is configured to:
  establish a radio link control RLC entity and/or a packet data convergence protocol PDCP entity corresponding to a sidelink communication interface radio bearer, if a destination identifier corresponding to the RLC entity and/or the PDCP entity does not have a corresponding SDAP entity, establish the corresponding SDAP entity.

Optionally, the first maintenance module 51 includes:
  a first transmitting unit, configured to transmit first request information to a network device, wherein the first request information is used to request to obtain sidelink communication interface radio bearer SLRB configuration information corresponding to a QoS flow associated with a third destination ID;
  a first receiving unit, configured to receive a first response message fed back by the network device, wherein the first response message is used to configure SLRB configuration information corresponding to the QoS flow;
  a first establishment unit, configured to, after a radio resource control RRC layer at the transmitting terminal receives the SLRB configuration information, if the SLRB configuration information carries the SDAP configuration information of the sidelink communication interface, establish the SDAP entity corresponding to the SDAP configuration information, or if the SLRB configuration message carries the SDAP configuration information of the sidelink communication interface and the SDAP entity corresponding to the SDAP configuration information is not established, establish the SDAP entity corresponding to the SDAP configuration information.

Optionally, the first maintenance module 51 includes:
  a second transmitting unit, configured to transmit second request information to the network device, wherein the second request information is used to request to obtain sidelink communication interface radio bearer SLRB configuration information corresponding to a QoS flow associated with a fourth destination ID;
  a second receiving unit, configured to receive a second response message fed back by the network device, wherein the second response message is used to configure SLRB configuration information corresponding to the QoS flow;
  a second establishment unit, configured to, after a radio resource control RRC layer of the transmitting terminal obtains the SLRB configuration information, if the sidelink communication destination ID corresponding to the SLRB configuration information does not have a corresponding SDAP entity, establish the corresponding SDAP entity.

Optionally, the first maintenance module 51 is configured to:
  establish the SDAP entity based on implementation of the transmitting terminal.

Optionally, the first maintenance module 51 includes at least one of the following:
  a first releasing unit, configured to, if a radio link failure (RLF) occurs on the sidelink communication interface of the transmitting terminal, release SDAP entities corresponding to all destination identifiers of the sidelink communication interface;
  a second releasing unit, configured to, if a unicast connection release is applied to the sidelink communication interface of the transmitting terminal, release the SDAP entities corresponding to all destination identifiers corresponding to the unicast connection;
  a third releasing unit, configured to, if all sidelink communication interface radio bearers SLRBs corresponding to an SDAP entity corresponding to a fifth destination ID of the transmitting terminal are released, release the SDAP entity corresponding to the fifth destination ID;
  a fourth releasing unit, configured to, if the transmitting terminal implements a state change, release the SDAP entities corresponding to all destination identifiers of the transmitting terminal;
  a fifth releasing unit, configured to release an SDAP entity corresponding to a sixth destination ID according to an instruction from a high layer;
  a sixth releasing unit, configured to release an SDAP entity corresponding to a seventh destination ID based on implementation of the transmitting terminal.

Further, the fourth releasing unit is configured to:
  If the transmitting terminal implements a state change, after receiving the SLRB configuration information of the sidelink communication radio interface after the state change, releasing the SDAP entities corresponding to all destination identifiers of the transmitting terminal; or,
  If the transmitting terminal implements a state change, starting a first timer, and after the first timer expires, releasing the SDAP entities corresponding to all destination identifiers of the transmitting terminal.

Further, after receiving the SLRB configuration information of the sidelink communication radio interface after the state change, the transmitting terminal further includes:
  a notification module, configured to notify a sidelink communication receiving terminal to release the SDAP entities corresponding to all destination identifiers corresponding to the transmitting terminal.

Optionally, if the first maintenance module 51 includes a fourth releasing unit, after the fourth releasing unit performs a state change on the transmitting terminal and releases the SDAP entities corresponding to all destination identifiers on the transmitting terminal, the first maintenance module 51 also includes:
  a first configuration unit, configured to establish the SDAP entity according to the sidelink communication interface radio bearer SLRB configuration information after the state change.

Further, the first configuration unit is configured to implement at least one of the following:
  If the transmitting terminal changes from a radio resource control connected state to a radio resource control idle state or a radio resource control inactive state, establish the SDAP entity according to SDAP configuration in SLRB configuration information configured in broadcast;
  If the transmitting terminal changes from the radio resource control connected state to an offline state, establish the SDAP entity according to SLRB configuration information configured in pre-configuration information;

If the transmitting terminal changes from the radio resource control idle state, the radio resource control inactive state or the offline state to the radio resource control connected state, establish the SDAP entity according to SDAP configuration in SLRB configuration information configured in a destination signaling.

Optionally, the first maintenance module 51 includes at least one of the following:

a first reconfiguration unit, configured to, if configuration information of newly added or modified sidelink communication interface radio bearer SLRB includes SDAP configuration information corresponding to an eighth destination ID, reconfigure the SDAP entity;

a second reconfiguration unit, configured to, if the transmitting terminal implements a state change, reconfigure the SDAP entity according to destination SDAP configuration information corresponding to a ninth destination ID.

Further, the second reconfiguration unit includes:

a first determining sub-unit, configured to, if the transmitting terminal changes the state, and SDAP configuration corresponding to the ninth destination ID corresponding to the sidelink communication interface radio bearer SLRB before and after the change are different, determine destination SDAP configuration information;

a first reconfiguration sub-unit, configured to reconfigure the SDAP entity corresponding to the ninth destination ID according to the destination SDAP configuration information.

Specifically, the first determining sub-unit is configured to implement at least one of the following:

If the transmitting terminal changes from the radio resource control connected state to the radio resource control idle state or the radio resource control inactive state and SDAP configuration corresponding to the SLRB in the radio resource control connected state is different from SDAP configuration in the radio resource control idle state or the radio resource control inactive state, determining that the SDAP configuration information corresponding to the ninth destination ID configured in the broadcast is the destination SDAP configuration information;

If the transmitting terminal changes from the radio resource control connected state to the offline state and the SDAP configuration corresponding to the SLRB in the radio resource control connected state is different from the SDAP configuration pre-configured in the offline state, determining that the SDAP configuration information corresponding to the ninth destination ID in the pre-configuration information is the destination SDAP configuration information;

If the transmitting terminal changes from the radio resource control idle state, the radio resource control inactive state or the offline state to the radio resource control connected state and the SDAP configuration corresponding to the SLRB in the radio resource control idle state, the radio resource control inactive state, or the offline state is different from the SDAP configuration in the radio resource control connected state, it is determined that the SDAP configuration information corresponding to the ninth destination ID in destination signaling is destination SDAP configuration information.

Specifically, the communication type corresponding to the cast type includes: broadcast communication of the sidelink communication interface, multicast communication of the sidelink communication interface, or unicast communication of the sidelink communication interface.

It should be noted that the transmitting terminal in this embodiment is in a one-to-one corresponding to the foregoing method embodiment, and all implementations in the foregoing method embodiment are applicable to the embodiment of the transmitting terminal, and the same technical effect can also be achieved.

Figure 6:
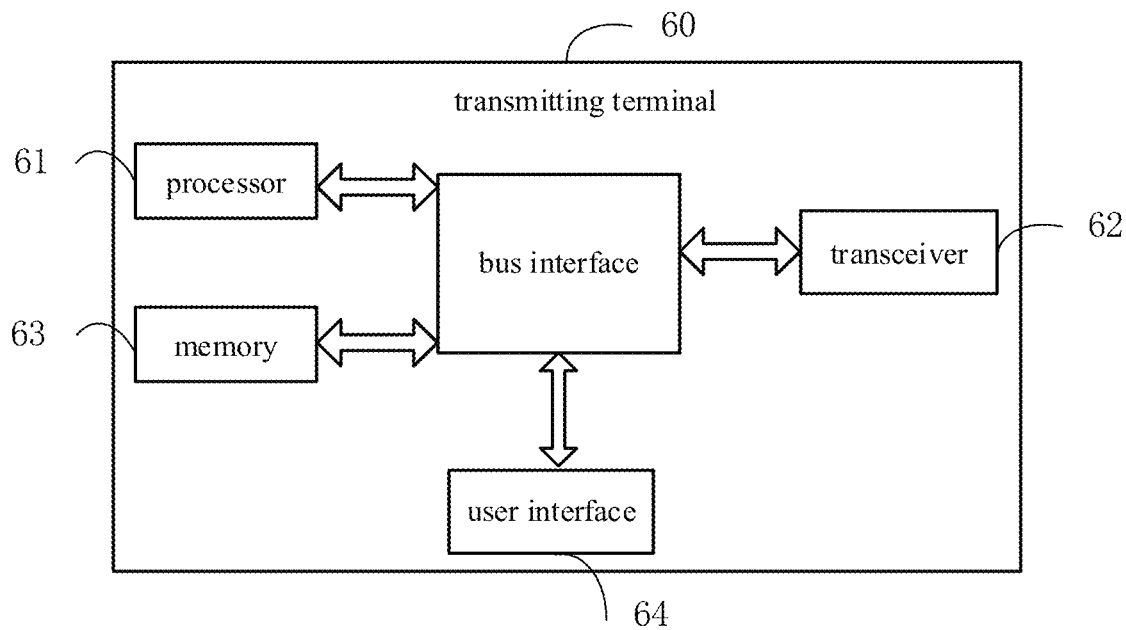
FIG. 6 shows a structural diagram of the transmitting terminal according to an embodiment of the present disclosure.

As shown in FIG. 6, an embodiment of the present disclosure also provides a transmitting terminal 60, including a processor 61, a transceiver 62, a memory 63, and a program stored on the memory 63 and executed by the processor 61; the transceiver 62 is connected to the processor 61 and the memory 63 through a bus interface, wherein the processor 61 is used to read a program in the memory and execute the following process:

maintaining an SDAP entity based on a destination identifier;

Wherein, the destination identifier includes: a sidelink communication destination ID; or The destination ID includes: a combination of a sidelink communication source ID and a sidelink communication destination ID; or The destination ID includes: a combination of a sidelink communication destination ID and a cast type; or The destination ID includes: a combination of a sidelink communication source ID, a sidelink communication destination ID, and a cast type; or The destination ID includes: the user ID of the transmitting terminal.

It should be noted that in FIG. 6, the bus architecture may include any number of interconnected buses and bridges. Specifically, various circuits of one or more processors represented by the processor 61 and the memory represented by the memory 63 are linked together. The bus architecture can also link various other circuits such as peripherals, voltage regulators, power maintenance circuits, etc., which are all known in the art, and therefore, will not be further described herein. The bus interface provides the interface. The transceiver 62 may be a plurality of elements, that is, including a transmitter and a transceiver, and provide a unit for communicating with various other devices on the transmission medium. For different transmitting terminals, the user interface 64 may also be an interface capable of externally or internally connecting required device, and the connected device includes but not limited to a keypad, a display, a speaker, a microphone, a joystick, and the like. The processor 61 is responsible for maintaining the bus architecture and general processing, and the memory 63 can store data used by the processor 61 when performing operations.

Optionally, the processor implements the following steps when executing the program of maintaining an SDAP entity based on a destination identifier:

receiving an establishment request or an establishment message of a first QoS flow associated with a first destination ID, and establishing an SDAP entity corresponding to the first destination ID.

Optionally, the processor implements the following steps when executing the program of maintaining an SDAP entity based on a destination identifier:

receiving a first data packet of a QoS flow associated with a second destination ID, and establishing an SDAP entity corresponding to the second destination ID.

Optionally, the processor implements the following steps when executing the program of maintaining an SDAP entity based on a destination identifier:

establishing a radio link control RLC entity and/or a packet data convergence protocol PDCP entity corresponding to a sidelink communication interface radio bearer, if a destination identifier corresponding to the RLC entity and/or the PDCP entity does not have a corresponding SDAP entity, establishing the corresponding SDAP entity.

Optionally, the processor implements the following steps when executing the program of maintaining an SDAP entity based on a destination identifier:

transmitting first request information to a network device, wherein the first request information is used to request to obtain sidelink communication interface radio bearer SLRB configuration information corresponding to a QoS flow associated with a third destination ID;

receiving a first response message fed back by the network device, wherein the first response message is used to configure SLRB configuration information corresponding to the QoS flow;

after a radio resource control RRC layer at the transmitting terminal receives the SLRB configuration information, if the SLRB configuration information carries the SDAP configuration information of the sidelink communication interface, establishing the SDAP entity corresponding to the SDAP configuration information, or if the SLRB configuration message carries the SDAP configuration information of the sidelink communication interface and the SDAP entity corresponding to the SDAP configuration information is not established, establishing the SDAP entity corresponding to the SDAP configuration information.

Optionally, the processor implements the following steps when executing the program of maintaining an SDAP entity based on a destination identifier:

transmitting second request information to the network device, wherein the second request information is used to request to obtain sidelink communication interface radio bearer SLRB configuration information corresponding to a QoS flow associated with a fourth destination ID;

receiving a second response message fed back by the network device, wherein the second response message is used to configure SLRB configuration information corresponding to the QoS flow;

after a radio resource control RRC layer of the transmitting terminal obtains the SLRB configuration information, if the sidelink communication destination ID corresponding to the SLRB configuration information does not have a corresponding SDAP entity, establishing the corresponding SDAP entity.

Optionally, the processor implements the following steps when executing the program of maintaining an SDAP entity based on a destination identifier:

establishing the SDAP entity based on implementation of the transmitting terminal.

Optionally, the processor implements at least one of the following when executing the program of maintaining an SDAP entity based on a destination identifier:

if a radio link failure (RLF) occurs on the sidelink communication interface of the transmitting terminal, releasing SDAP entities corresponding to all destination identifiers of the sidelink communication interface;

if a unicast connection release is applied to the sidelink communication interface of the transmitting terminal, releasing the SDAP entities corresponding to all destination identifiers corresponding to the unicast connection;

if all sidelink communication interface radio bearer SLRBs corresponding to an SDAP entity corresponding to a fifth destination ID of the transmitting terminal are released, releasing the SDAP entity corresponding to the fifth destination ID;

if the transmitting terminal implements a state change, releasing the SDAP entities corresponding to all destination identifiers of the transmitting terminal;

releasing an SDAP entity corresponding to a sixth destination ID according to an instruction from a high layer;

releasing an SDAP entity corresponding to a seventh destination ID based on implementation of the transmitting terminal.

Further, when the processor executes the program of releasing SDAP entities corresponding to all destination identifiers at the transmitting terminal if the transmitting terminal implements a state change, the following is achieved:

If the transmitting terminal implements a state change, after receiving the SLRB configuration information of the sidelink communication radio interface after the state change, releasing the SDAP entities corresponding to all destination identifiers of the transmitting terminal; or, If the transmitting terminal implements a state change, starting a first timer, and after the first timer expires, releasing the SDAP entities corresponding to all destination identifiers of the transmitting terminal.

Optionally, after receiving the SLRB configuration information of the sidelink communication radio interface after the state change, the processor further implements the following steps when executing the program:

notifying a sidelink communication receiving terminal to release the SDAP entities corresponding to all destination identifiers corresponding to the transmitting terminal.

Specifically, after performing a state change on the transmitting terminal and releasing the SDAP entities corresponding to all destination identifiers on the transmitting terminal, the processor further executes the program to realize the following steps:

establishing the SDAP entity according to the sidelink communication interface radio bearer SLRB configuration information after the state change.

Further, the processor implements at least one of the following when executing the procedure of establishing the SDAP entity according to the sidelink communication interface radio bearer SLRB configuration information after the state change:

If the transmitting terminal changes from a radio resource control connected state to a radio resource control idle state or a radio resource control inactive state, establishing the SDAP entity according to SDAP configuration in SLRB configuration information configured in broadcast;

If the transmitting terminal changes from the radio resource control connected state to an offline state, establishing the SDAP entity according to SLRB configuration information configured in pre-configuration information;

If the transmitting terminal changes from the radio resource control idle state, the radio resource control inactive state or the offline state to the radio resource control connected state, establishing the SDAP entity according to SDAP configuration in SLRB configuration information configured in a destination signaling.

Optionally, the processor implements at least one of the following when executing the program of maintaining an SDAP entity based on an destination ID:
- if newly added or modified sidelink communication interface radio bearer SLRB configuration information includes SDAP configuration information corresponding to an eighth destination ID, reconfiguring the SDAP entity;
- if the transmitting terminal implements a state change, reconfiguring the SDAP entity according to destination SDAP configuration information corresponding to a ninth destination ID.

Further, when the processor executes the procedure of if the transmitting terminal performs a state change, reconfiguring the SDAP entity according to the destination SDAP configuration information corresponding to the ninth destination ID, the following steps are implemented:
- if the transmitting terminal changes the state, and SDAP configuration corresponding to the ninth destination ID corresponding to the sidelink communication interface radio bearer SLRB before and after the change are different, determining destination SDAP configuration information;
- reconfiguring the SDAP entity corresponding to the ninth destination ID according to the destination SDAP configuration information.

Specifically, when the processor executes the procedure of, if the transmitting terminal implements a state change and the SDAP configuration corresponding to the ninth destination ID corresponding to the sidelink communication interface radio bearer SLRB before and after the change are different, determining the destination SDAP configuration information, implementing at least one of the following:
- If the transmitting terminal changes from the radio resource control connected state to the radio resource control idle state or the radio resource control inactive state and SDAP configuration corresponding to the SLRB in the radio resource control connected state is different from SDAP configuration in the radio resource control idle state or the radio resource control inactive state, determining that the SDAP configuration information corresponding to the ninth destination ID configured in the broadcast is the destination SDAP configuration information;
- If the transmitting terminal changes from the radio resource control connected state to the offline state and the SDAP configuration corresponding to the SLRB in the radio resource control connected state is different from the SDAP configuration pre-configured in the offline state, determining that the SDAP configuration information corresponding to the ninth destination ID in the pre-configuration information is the destination SDAP configuration information;
- If the transmitting terminal changes from the radio resource control idle state, the radio resource control inactive state or the offline state to the radio resource control connected state and the SDAP configuration corresponding to the SLRB in the radio resource control idle state, the radio resource control inactive state, or the offline state is different from the SDAP configuration in the radio resource control connected state, it is determined that the SDAP configuration information corresponding to the ninth destination ID in destination signaling is destination SDAP configuration information.

Specifically, the communication type corresponding to the cast type includes: broadcast communication of the sidelink communication interface, multicast communication of the sidelink communication interface, or unicast communication of the sidelink communication interface.

The embodiment of the present disclosure also provides a computer-readable storage medium on which a computer program is stored, wherein when the computer program is executed by a processor, the steps of the SDAP entity maintenance method applied to the transmitting terminal are realized.

Figure 7:
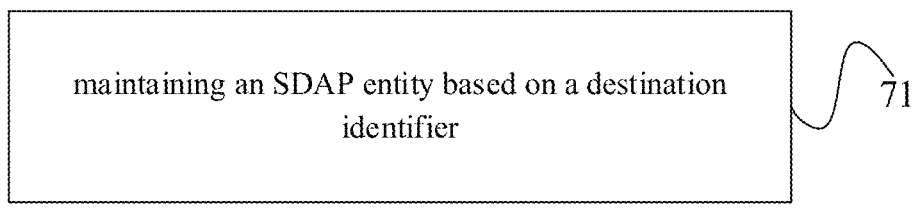
FIG. 7 shows a schematic flowchart of an SDAP entity maintenance method applied to a receiving terminal according to an embodiment of the present disclosure.

As shown in FIG. 7, the SDAP entity maintenance method of the embodiment of the present disclosure, applied to the receiving terminal, includes:
- Step 71: maintaining an SDAP entity based on a destination identifier;
- It should be noted that the destination identifier adopts one of the following situations:
- Y11. The destination ID includes: a sidelink communication destination ID;
- Y12. The destination ID includes: a combination of a sidelink communication source ID and a sidelink communication destination ID;
- It should be noted that the sidelink communication destination ID is usually used to distinguish services, that is, different sidelink communication destination IDs correspond to different services. In the access network, the sidelink communication destination ID can also be called Destination Layer-2 ID. The sidelink communication source ID refers to the user ID of the transmitting terminal of the sidelink communication (in this embodiment, the sidelink communication source ID is the user ID of the transmitting terminal itself). In the access network, the sidelink communication source ID also be called Source Layer-2 ID. One receiving terminal may have a sidelink communication interface with a plurality of transmitting terminals, so there may be a plurality of sidelink communication source IDs. For one transmitting terminal, the receiving terminal and the transmitting terminal may have a plurality of sidelink communication services, so one sidelink communication source ID may correspond to a plurality of sidelink communication IDs. That is to say, for the receiving terminal, each SDAP entity needs to be identified by a combination of the sidelink communication source ID and the sidelink communication destination ID, and the SDAP entity needs to be maintained based on the combination.
- Y13. The destination ID includes: a combination of a sidelink communication destination ID and a cast type;
- It should be noted that the communication type corresponding to the cast type includes: broadcast communication of the sidelink communication interface, multicast communication of the sidelink communication interface, or unicast communication of the sidelink communication interface.
- Y14. The destination ID includes: a combination of the sidelink communication source ID, the sidelink communication destination ID, and the cast type;
- Y15. The destination ID includes: a user ID of the receiving terminal;
- It should be noted that in this case, the user ID of the receiving terminal is used as the destination identifier. Since one receiving terminal has only one user ID, in this case, there is only one SDAP entity for one receiving terminal.

The maintenance of the SDAP entity in the embodiments of the present disclosure mainly includes: establishment of the SDAP entity, release of the SDAP entity, and reconfiguration of the SDAP entity. The specific implementation of the embodiments of the present disclosure are described in detail from these three aspects as follows.

1. Establishment of the SDAP entity

The establishment of the SDAP entity mainly includes one of the following:

B11. The establishment of the SDAP entity triggered by the configuration message of the sidelink communication interface radio bearer (SLRB) of the sidelink communication interface unicast communication A specific implementation in this case is: for sidelink communication interface unicast communication, receiving a first message sent by a sidelink communication opposite terminal for performing the sidelink communication interface radio bearer SLRB configuration, if the first message includes the SDAP configuration corresponding to the first destination ID and the SDAP entity corresponding to the SDAP configuration does not exist at the receiving terminal, establishing the SDAP entity corresponding to the SDAP configuration.

It should be noted that the first message may be a sidelink communication interface radio resource control (PC5-RRC) message, and the first destination ID refers to any sidelink communication destination ID, or the combination of any sidelink communication destination ID and any sidelink communication source ID; in this case, as long as the receiving terminal receives the PC5-RRC message including the SDAP configuration corresponding to any destination ID, when the receiving terminal does not have the SDAP entity corresponding to the SDAP configuration, It is necessary to establish the SDAP entity corresponding to the SDAP configuration in the PC5-RRC message.

Another specific implementation in this case is: for sidelink communication interface unicast communication, receiving a second message sent by the sidelink communication opposite terminal for performing the sidelink communication interface radio bearer SLRB configuration, and the second destination ID corresponding to the SLRB does not have a corresponding SDAP entity, establishing the corresponding SDAP entity;

It should be noted that the second message may be a sidelink communication interface radio resource control (PC5-RRC) message, and the second destination ID refers to any sidelink communication destination ID, or the combination of any sidelink communication destination ID and any sidelink communication source ID; in this case, as long as the receiving terminal receives the PC5-RRC message, when the destination identifier corresponding to the SLRB configuration in the PC5-RRC message does not have a corresponding SDAP entity, the SDAP entity corresponding to the sidelink communication destination ID corresponding to the SLRB configuration in the PC5-RRC message is established.

B12. The establishment of the SDAP entity triggered by a radio link control (RLC) entity and/or a packet data convergence protocol (PDCP) entity The specific implementation in this case is: for the sidelink communication interface radio bearer SLRB, if a third destination ID corresponding to the radio link control RLC entity and/or the packet data convergence protocol PDCP entity corresponding to the SLRB does not have a corresponding SDAP entity, establishing the corresponding SDAP entity;

It should be noted that the third destination ID refers to any sidelink communication destination ID, or a combination of any sidelink communication destination ID and any sidelink communication source ID; that is, in this case, after the RLC entity and/or PDCP entity corresponding to the SLRB is established, if the receiving terminal determines that the destination identifier corresponding to the established RLC entity and/or PDCP entity does not have a corresponding SDAP entity, the receiving terminal establishes the SDAP entity corresponding to the destination identifier corresponding to the RLC entity and/or the PDCP entity.

B13. The establishment of the SDAP entity triggered by a data packet

The specific implementation in this case is: if a first data packet corresponding to a sixth destination ID is received, establishing an SDAP entity corresponding to the sixth destination ID.

It should be noted that the sixth destination ID refers to any sidelink communication destination ID, or a combination of any sidelink communication destination ID and any sidelink communication source ID; that is, when the receiving terminal receives a data packet corresponding to any destination ID (may be the first data packet), it is necessary to establish an SDAP entity corresponding to the destination identifier.

B14. The establishment of the SDAP entity triggered by the PDCP entity or the RLC entity The specific implementation in this case is: if a first PDCP entity or a first RLC entity corresponding to a fourth destination ID is established, establishing an SDAP entity corresponding to the fourth destination ID.

It should be noted that the fourth destination ID refers to any sidelink communication destination ID, or a combination of any sidelink communication destination ID and any sidelink communication source ID; that is, if the first PDCP entity corresponding to the destination identifier is established, it is necessary to establish an SDAP entity corresponding to the destination identifier; or, if the first RLC entity corresponding to the destination identifier is established, it is necessary to establish the SDAP entity corresponding to the destination identifier.

It should be noted that the above B11-B14 are specific implementations of establishing an entity. The receiving terminal can establish an SDAP entity at an appropriate time according to the entity establishment method described in any of the above. It also needs to be noted that B11, B12 and B14 have been able to determine the specific sidelink communication source ID before establishing the SDAP entity, so the receiving terminal only needs to establish the SDAP entity according to the sidelink communication destination ID; and in B13, the receiving terminal may need to transmit data packets to a plurality of opposite terminals. Therefore, the receiving terminal has to determine which opposite terminal the established SDAP entity is for before establishing the SDAP entity.

B15. The establishment of the SDAP entity corresponding to a fifth destination ID based on the implementation of the receiving terminal It should be noted that the fifth destination ID refers to any sidelink communication destination ID, or a combination of any sidelink communication destination ID and any sidelink communication source ID; in this case, the timing of establishing the SDAP entity is determined based on the implementation of the receiving terminal, and the above-mentioned B11-B14 can be regarded as the specific way of the implementations of the receiving terminal.

2. Release of the SDAP Entity

The release method of the SDAP entity mainly includes at least one of the following:

B21. For sidelink communication interface unicast communication, receiving a sidelink communication interface unicast connection release message and releasing SDAP entities corresponding to all destination identifiers of the unicast connection;

It should be noted that the sidelink communication interface unicast connection includes: a PC5-RRC connection or a sidelink communication interface signaling protocol layer (PC5-S) connection; in this case, the receiving terminal receives the release message for which connection, then releases the SDAP entities corresponding to all destination identifiers of the unicast connection, and the SDAP entity includes: all SDAP entities corresponding to all the destination identifiers of the unicast connection.

B22. If all sidelink communication interface radio bearer SLRBs corresponding to the SDAP entity corresponding to a seventh destination ID are released, releasing the SDAP entity corresponding to the seventh destination ID;

It should be noted that the seventh destination ID refers to any sidelink communication destination ID, or a combination of any sidelink communication destination ID and any sidelink communication source ID; that is, if all the SLRBs corresponding to the SDAP entity corresponding to one destination ID are released, the receiving terminal also needs to release the SDAP entity.

B23. If the packet data convergence protocol entity or the radio link control entity corresponding to the SDAP entity corresponding to an eighth destination ID is released, releasing the SDAP entity corresponding to the eighth destination ID;

It should be noted that the eighth destination ID refers to any sidelink communication destination ID, or a combination of any sidelink communication destination ID and any sidelink communication source ID; that is, if the PDCP entity corresponding to the SDAP entity corresponding to one destination ID is released, the receiving terminal also needs to release the SDAP entity; or, if the RLC entity corresponding to the SDAP entity corresponding to one destination ID is released, the receiving terminal also needs to release the SDAP entity.

B24. For the destination communication mode, if the receiving terminal implements a state change, releasing SDAP entities corresponding to all destination identifiers in a destination communication mode;

It should be noted that the destination communication mode includes broadcast communication or multi cast communication.

It should be noted that if the receiving terminal implements a state change in the broadcast communication or the multicast communication, it needs to release all established SDAP entities of all sidelink communication destination IDs.

The state change mainly refers to the change from an online state to an offline state and from the offline state to the online state; specifically, the online state mainly refers to: a radio resource control connected state (RRC_CONNECTED), a radio resource control idle state (RRC_IDLE) and a radio resource control inactive state (RRC_INACTIVE).

Further, the specific implementation of this situation includes one of the following:

B241. If the receiving terminal implements a state change, after receiving the SLRB configuration information of the sidelink communication radio interface after the state change, releasing the SDAP entities corresponding to all destination identifiers in the destination communication mode;

It should be noted that the SDAP entity is not released sidelinkly after the state is changed at the receiving terminal. Only after the receiving terminal receives the SLRB configuration information of the sidelink communication radio interface after the state change, the SDAP entity corresponding to all the destination identifiers in the destination communication mode at the receiving terminal is released.

B242. If the receiving terminal implements a state change, starting a second timer, and after the second timer expires, releasing the SDAP entities corresponding to all destination identifiers in the destination communication mode;

It should be noted that the SDAP entity is not released sidelinkly after the state is changed at the receiving terminal, a timer (i.e. the second timer) is started first, and only after the timer expires, the SDAP entity corresponding to all destination identifiers in the destination communication mode at the receiving terminal is released; the timing duration of the timer can be configured by the network side device, or it can be pre-configured.

Specifically, after the state is changed and the SDAP entity corresponding to all destination identifiers is released, the receiving terminal also needs to reestablish the SDAP entity. The specific implementation method is: if the receiving terminal changes the state, and the SDAP configuration before the change and after the change are different, the destination SDAP configuration information is determined; and the corresponding SDAP entity is established according to the destination SDAP configuration information.

It should be noted that specific contents of the destination SDAP configuration information corresponding to different state change methods are also different. The following describes how to determine the destination SDAP configuration information from the perspective of different state change methods.

B241. The receiving terminal changes from the online state to the offline state

Specifically, in this case, if the SDAP configuration configured by the network in the online state is inconsistent with the SDAP configuration pre-configured in the offline state, it is determined that the SDAP configuration information in the pre-configuration information is the destination SDAP configuration information.

B242. The receiving terminal changes from the offline state to the online state

Specifically, in this case, if the SDAP configuration pre-configured in the offline state is inconsistent with the SDAP configuration configured by the network in the online state, it is determined that the SDAP configuration information configured by the network is the destination SDAP configuration information.

3. Reconfiguration of the SDAP Entity

For SDAP entity reconfiguration methods, it mainly includes the following implementation methods:

For sidelink communication interface unicast, if newly added or modified sidelink communication interface radio bearer SLRB configuration information includes SDAP configuration information corresponding to a ninth destination ID, reconfiguring the SDAP entity corresponding to the ninth destination identifier.

It should be noted that the ninth destination ID refers to any sidelink communication destination ID, or a combination of any sidelink communication destination ID and any sidelink communication source ID; for sidelink communication interface unicast, when SLRB configuration information corresponding to the newly added SLRB contains SDAP configuration information, SDAP entity needs to be reconfigured. During reconfiguration, the SDAP entity reconfiguration is performed according to the SDAP configuration information contained in the configuration information of the newly added SLRB; when the SLRB configuration information corresponding to the modified SLRB contains the SDAP configuration information of the destination identifier, the SDAP entity needs to be reconfigured. During the reconfiguration, the SDAP entity reconfiguration is performed according to the SDAP configuration information included in the modified SLRB configuration information.

It should be noted that the embodiments of the present disclosure can ensure that the receiving terminal can accurately maintain the SDAP entity, and can ensure the reliability of the NR V2X communication service.

Figure 8:
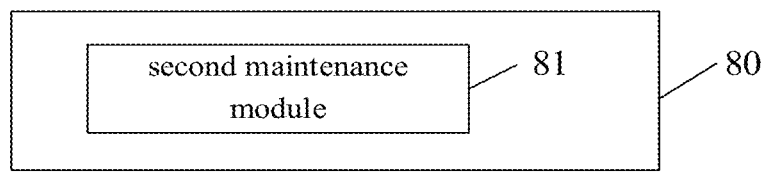
FIG. 8 shows a schematic diagram of modules of the receiving terminal according to an embodiment of the present disclosure.

As shown in FIG. 8, an embodiment of the present disclosure provides a receiving terminal 80, including:
a second maintenance module 81, configured to maintain an SDAP entity based on a destination identifier;
Wherein, the destination identifier includes: a sidelink communication destination ID; or
The destination ID includes: a combination of a sidelink communication source ID and a sidelink communication destination ID; or
The destination ID includes: a combination of a sidelink communication destination ID and a cast type; or
The destination ID includes: a combination of a sidelink communication source ID, a sidelink communication destination ID, and a cast type; or
The destination ID includes: the user ID of the receiving terminal.

Optionally, the second maintenance module 81 is configured to implement at least one of the following:
for sidelink communication interface unicast communication, receiving a first message sent by a sidelink communication opposite terminal for performing the sidelink communication interface radio bearer SLRB configuration, if the first message includes the SDAP configuration corresponding to the first destination ID and the SDAP entity corresponding to the SDAP configuration does not exist at the receiving terminal, establishing the SDAP entity corresponding to the SDAP configuration;
for sidelink communication interface unicast communication, receiving a second message sent by the sidelink communication opposite terminal for performing the sidelink communication interface radio bearer SLRB configuration, and the second destination ID corresponding to the SLRB does not have a corresponding SDAP entity, establishing the corresponding SDAP entity;
for the sidelink communication interface radio bearer SLRB, if a third destination ID corresponding to the radio link control RLC entity and/or the packet data convergence protocol PDCP entity corresponding to the SLRB does not have a corresponding SDAP entity, establishing the corresponding SDAP entity;

if a first PDCP entity or a first RLC entity corresponding to a fourth destination ID is established, establishing an SDAP entity corresponding to the fourth destination ID;
establishing an SDAP entity corresponding to a fifth destination ID based on the implementation of the receiving terminal;
if a first data packet corresponding to a sixth destination ID is received, establishing an SDAP entity corresponding to the sixth destination ID.

Optionally, the second maintenance module 81 includes at least one of the following:
a sixth releasing unit, configured to, for sidelink communication interface unicast communication, receive a sidelink communication interface unicast connection release message and release SDAP entities corresponding to all destination identifiers of the unicast connection, the sidelink communication interface unicast connection including: a PC5-RRC connection or a sidelink communication interface signaling protocol layer (PC5-S) connection;
a seventh releasing unit, configured to, if all sidelink communication interface radio bearer SLRBs corresponding to the SDAP entity corresponding to a seventh destination ID are released, release the SDAP entity corresponding to the seventh destination ID;
an eighth releasing unit, configured to, if the packet data convergence protocol entity or the radio link control entity corresponding to the SDAP entity corresponding to an eighth destination ID is released, release the SDAP entity corresponding to the eighth destination ID;
a ninth releasing unit, configured to, for the destination communication mode, if the receiving terminal implements a state change, release SDAP entities corresponding to all destination identifiers in a destination communication mode.

Further, the ninth releasing unit is configured to:
If the receiving terminal implements a state change, after receiving the SLRB configuration information of the sidelink communication radio interface after the state change, release the SDAP entities corresponding to all destination identifiers in the destination communication mode; or
If the receiving terminal implements a state change, start a second timer, and after the second timer expires, release the SDAP entities corresponding to all destination identifiers in the destination communication mode.

Further, if the second maintenance module 81 includes a ninth releasing unit, the ninth release unit executes that, if the receiving terminal changes the state, after the SDAP entities corresponding to all the destination identifiers of the destination communication mode are released, and the second maintenance module 81 further includes:
a first determining unit, configured to, if the receiving terminal changes the state and the SDAP configuration before the change is inconsistent with the SDAP configuration after the change, determine the destination SDAP configuration information;
a first establishment unit, configured to establish a corresponding SDAP entity according to the destination SDAP configuration information.

Further, the second maintenance module 81 includes at least one of the following:
a third reconfiguration unit, configured to, for the sidelink communication interface unicast, if the SLRB configuration information corresponding to newly added or modified sidelink communication interface radio bearer SLRB includes the SDAP configuration information corresponding to the ninth destination ID, reconfigure the SDAP entity corresponding to the ninth destination ID.

Specifically, the first determining unit includes at least one of the following:

the receiving terminal changes from the online state to the offline state, if the SDAP configuration configured by the network in the online state is inconsistent with the SDAP configuration pre-configured in the offline state, determining that the SDAP configuration information in the pre-configuration information is the destination SDAP configuration information.

the receiving terminal changes from the offline state to the online state, if the SDAP configuration pre-configured in the offline state is inconsistent with the SDAP configuration configured by the network in the online state, determining that the SDAP configuration information configured by the network is the destination SDAP configuration information.

Specifically, the online state includes: at least one of a radio resource control connected state, a radio resource control idle state, and a radio resource control inactive state.

Specifically, the communication type corresponding to the cast type includes: broadcast communication of the sidelink communication interface, multicast communication of the sidelink communication interface, or unicast communication of the sidelink communication interface.

It should be noted that the receiving terminal embodiment is a receiving terminal corresponding to the foregoing method embodiment in a one-to-one manner, and all implementation in the foregoing method embodiment are applicable to the receiving terminal embodiment, and the same technical effect can also be achieved.

Figure 9:
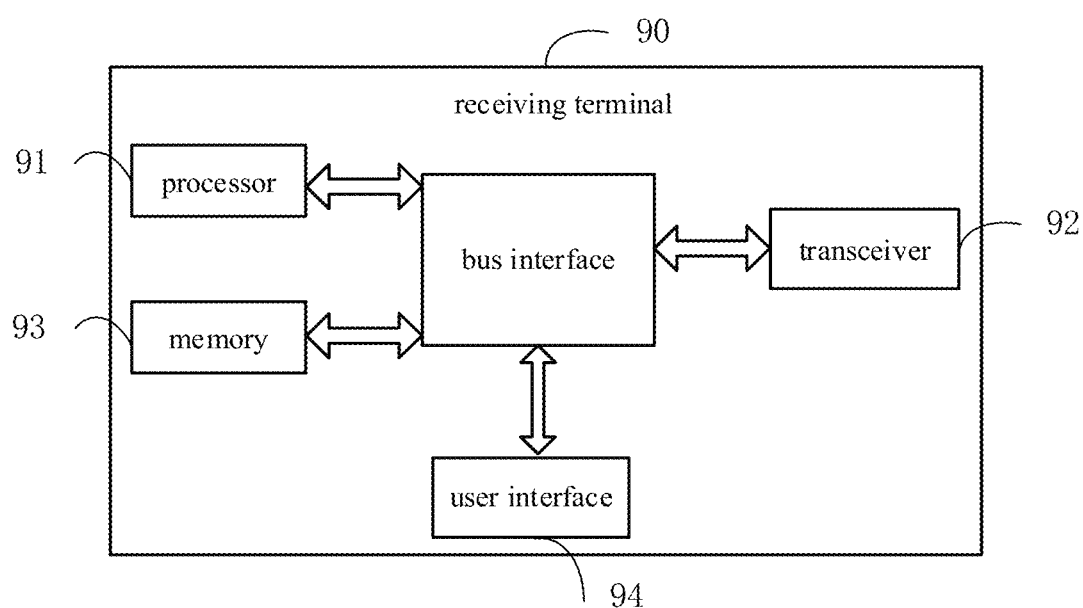
FIG. 9 shows a structural diagram of the receiving terminal according to an embodiment of the present disclosure.

As shown in FIG. 9, an embodiment of the present disclosure also provides a receiving terminal 90, including a processor 91, a transceiver 92, a memory 93, and a program stored on the memory 93 and executed by the processor 91; wherein, the transceiver 92 is connected to the processor 91 and the memory 93 through a bus interface, where the processor 91 is used to read a program in the memory and execute the following process:

maintaining an SDAP entity based on a destination identifier;

Wherein, the destination identifier includes: a sidelink communication destination ID; or The destination ID includes: a combination of a sidelink communication source ID and a sidelink communication destination ID; or The destination ID includes: a combination of a sidelink communication destination ID and a cast type; or The destination ID includes: a combination of a sidelink communication source ID, a sidelink communication destination ID, and a cast type; or The destination ID includes: the user ID of the receiving terminal.

It should be noted that, in FIG. 9, the bus architecture may include any number of interconnected buses and bridges. Specifically, various circuits of one or more processors represented by the processor 91 and the memory represented by the memory 93 are linked together. The bus architecture can also link various other circuits such as peripherals, voltage regulators, power maintenance circuits, etc., which are all known in the art, and therefore, will not be further described herein. The bus interface provides the interface. The transceiver 92 may be a plurality of elements, including a transmitter and a transceiver, and provide a unit for communicating with various other devices on the transmission medium. For different receiving terminals, the user interface 94 may also be an interface capable of externally or internally connecting required devices, and the connected devices include but not limited to a keypad, a display, a speaker, a microphone, a joystick, and the like. The processor 91 is responsible for maintaining the bus architecture and general processing, and the memory 93 can store data used by the processor 91 when performing operations.

Optionally, the processor implements at least one of the following when executing the program of maintaining an SDAP entity based on a destination identifier:

for sidelink communication interface unicast communication, receiving a first message sent by a sidelink communication opposite terminal for performing the sidelink communication interface radio bearer SLRB configuration, if the first message includes the SDAP configuration corresponding to the first destination ID and the SDAP entity corresponding to the SDAP configuration does not exist at the receiving terminal, establishing the SDAP entity corresponding to the SDAP configuration;

for sidelink communication interface unicast communication, receiving a second message sent by the sidelink communication opposite terminal for performing the sidelink communication interface radio bearer SLRB configuration, and the second destination ID corresponding to the SLRB does not have a corresponding SDAP entity, establishing the corresponding SDAP entity;

for the sidelink communication interface radio bearer SLRB, if a third destination ID corresponding to the radio link control RLC entity and/or the packet data convergence protocol PDCP entity corresponding to the SLRB does not have a corresponding SDAP entity, establishing the corresponding SDAP entity;

if a first PDCP entity or a first RLC entity corresponding to a fourth destination ID is established, establishing an SDAP entity corresponding to the fourth destination ID;

establishing an SDAP entity corresponding to a fifth destination ID based on the implementation of the receiving terminal;

if a first data packet corresponding to a sixth destination ID is received, establishing an SDAP entity corresponding to the sixth destination ID.

Optionally, the processor implements at least one of the following when executing the program of maintaining an SDAP entity based on a destination identifier:

for sidelink communication interface unicast communication, receiving a sidelink communication interface unicast connection release message and releasing SDAP entities corresponding to all destination identifiers of the unicast connection, the sidelink communication interface unicast connection including: a PC5-RRC connection or a sidelink communication interface signaling protocol layer (PC5-S) connection;

if all sidelink communication interface radio bearer SLRBs corresponding to the SDAP entity corresponding to a seventh destination ID are released, releasing the SDAP entity corresponding to the seventh destination ID;

if the packet data convergence protocol entity or the radio link control entity corresponding to the SDAP entity corresponding to an eighth destination ID is released, releasing the SDAP entity corresponding to the eighth destination ID;

for the destination communication mode, if the receiving terminal implements a state change, releasing SDAP entities corresponding to all destination identifiers in a destination communication mode, the destination communication mode includes broadcast communication or multicast communication.

Further, when the processor executes the program of if the receiving terminal implements a state change, releasing SDAP entities corresponding to all destination identifiers in the destination communication mode, the following is achieved:

If the receiving terminal implements a state change, after receiving the SLRB configuration information of the sidelink communication radio interface after the state change, releasing the SDAP entities corresponding to all destination identifiers in the destination communication mode; or If the receiving terminal implements a state change, start a second timer, and after the second timer expires, releasing the SDAP entities corresponding to all destination identifiers in the destination communication mode.

Further, after the processor executes the program of if the receiving terminal implements a state change, releasing the SDAP entities corresponding to all destination identifiers in the destination communication mode, the processor executes the program to further implement the following steps:

if the receiving terminal changes the state and the SDAP configuration before the change is inconsistent with the SDAP configuration after the change, determining the destination SDAP configuration information;

establishing a corresponding SDAP entity according to the destination SDAP configuration information.

Optionally, the processor implements the following steps when executing the program of maintaining an SDAP entity based on a destination identifier:

for the sidelink communication interface unicast, if the SLRB configuration information corresponding to newly added or modified sidelink communication interface radio bearer SLRB includes the SDAP configuration information corresponding to the ninth destination ID, reconfiguring the SDAP entity corresponding to the ninth destination ID.

Specifically, when the processor executes the program of if the receiving terminal changes the state and the SDAP configuration before the change is inconsistent with the SDAP configuration after the change, determining destination SDAP configuration information, at least one of the following is achieved:

the receiving terminal changes from the online state to the offline state, if the SDAP configuration configured by the network in the online state is inconsistent with the SDAP configuration pre-configured in the offline state, determining that the SDAP configuration information in the pre-configuration information is the destination SDAP configuration information.

the receiving terminal changes from the offline state to the online state, if the SDAP configuration pre-configured in the offline state is inconsistent with the SDAP configuration configured by the network in the online state, determining that the SDAP configuration information configured by the network is the destination SDAP configuration information.

Specifically, the network status includes: at least one of a radio resource control connected state, a radio resource control idle state, and a radio resource control inactive state.

Specifically, the communication type corresponding to the cast type includes: broadcast communication of the sidelink communication interface, multicast communication of the sidelink communication interface, or unicast communication of the sidelink communication interface.

The embodiment of the present disclosure also provides a computer-readable storage medium on which a computer program is stored, wherein when the computer program is executed by a processor, the steps of the SDAP entity maintenance method applied to the receiving terminal are realized.

It should be noted that the transmitting terminal and the receiving terminal mentioned in this disclosure both refer to terminals capable of sidelink communication.

It can be understood that the embodiments described in the embodiments of the present disclosure may be implemented by hardware, software, firmware, middleware, microcode, or a combination thereof. For hardware implementation, units, modules, sub-units and sub-modules can be implemented in one or more application specific integrated circuits (ASIC), digital signal processors (DSP), digital signal processing equipment (DSP Device, DSPD), Programmable Logic Device (PLD), Field-Programmable Gate Array (FPGA), general-purpose processors, controllers, microcontrollers, microprocessors, other electronic units used to execute functions of the present disclosure or combinations thereof.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented in the processor or external to the processor.

The above are optional implementations of the present disclosure. It should be pointed out that for those of ordinary skill in the art, several improvements and modifications can be made without departing from the principles of the present disclosure. These improvements and modifications should also be within the protection scope of the present disclosure.

What is claimed is:

1. A Service Data Adaptation Protocol (SDAP) entity maintenance method, which is performed by a transmitting terminal, the SDAP entity maintenance method comprising:

maintaining an SDAP entity based on a destination identifier;

wherein the destination identifier includes: a combination of the sidelink communication destination ID and a cast type; or the destination identifier includes: a combination of the sidelink communication source ID, the sidelink communication destination ID, and the cast type, wherein maintaining the SDAP entity based on a destination identifier comprises:

receiving an establishment request or an establishment message of a first Quality of Service (Qos) flow associated with a first destination ID, and establishing an SDAP entity corresponding to the first destination ID, or, wherein maintaining the SDAP entity based on a destination identifier comprises:

receiving a first data packet of a QoS flow associated with a second destination ID, and establishing an SDAP entity corresponding to the second destination ID, or, wherein maintaining the SDAP entity based on a destination identifier comprises:

transmitting first request information to a network device, wherein the first request information is used to request to obtain sidelink communication interface radio bearer (SLRB) configuration information corresponding to a QoS flow associated with a third destination ID;

receiving a first response message fed back by the network device, wherein the first response message is used to configure the SLRB configuration information corresponding to the QoS flow;

after a radio resource control (RRC) layer at the transmitting terminal receives the SLRB configuration information, if the SLRB configuration information carries the SDAP configuration information of the sidelink communication interface, establishing an SDAP entity corresponding to the SDAP configuration information, or if the SLRB configuration message carries the SDAP configuration information of the sidelink communication interface and the SDAP entity corresponding to the SDAP configuration information is not established, establishing the SDAP entity corresponding to the SDAP configuration information, or, wherein maintaining the SDAP entity based on a destination identifier comprises:

transmitting second request information to a network device, wherein the second request information is used to request to obtain SLRB configuration information corresponding to a QoS flow associated with a fourth destination ID;

receiving a second response message fed back by the network device, wherein the second response message is used to configure the SLRB configuration information corresponding to the QoS flow;

after a radio resource control (RRC) layer at the transmitting terminal obtains the SLRB configuration information, if the sidelink communication destination ID corresponding to the SLRB configuration information does not have a corresponding SDAP entity, establishing the corresponding SDAP entity, or, wherein maintaining the SDAP entity based on a destination identifier includes at least one of the following:

if a radio link failure (RLF) occurs on a sidelink communication interface of the transmitting terminal, releasing SDAP entities corresponding to all destination identifiers of the sidelink communication interface;

if a unicast connection release is applied to the sidelink communication interface of the transmitting terminal, releasing SDAP entities corresponding to all destination identifiers corresponding to the unicast connection;

if all sidelink communication interface radio bearer SLRBs corresponding to an SDAP entity corresponding to a fifth destination ID of the transmitting terminal are released, releasing the SDAP entity corresponding to the fifth destination ID;

if the transmitting terminal implements a state change, releasing the SDAP entities corresponding to all destination identifiers of the transmitting terminal;

releasing an SDAP entity corresponding to a sixth destination ID according to an instruction from a high layer;

releasing an SDAP entity corresponding to a seventh destination ID based on implementation of the transmitting terminal, or, wherein maintaining the SDAP entity based on a destination identifier includes at least one of the following:

if newly added or modified SLRB configuration information includes SDAP configuration information corresponding to an eighth destination ID, reconfiguring the SDAP entity;

if the transmitting terminal implements a state change, reconfiguring the SDAP entity according to destination SDAP configuration information corresponding to a ninth destination ID.

2. The SDAP entity maintenance method according to claim 1, wherein maintaining the SDAP entity based on a destination identifier comprises:

establishing a radio link control (RLC) entity corresponding to a sidelink communication interface radio bearer, if a destination identifier corresponding to the RLC entity does not have a corresponding SDAP entity, establishing the corresponding SDAP entity; or establishing a packet data convergence protocol (PDCP) entity corresponding to a sidelink communication interface radio bearer, if a destination identifier corresponding to the PDCP entity does not have a corresponding SDAP entity, establishing the corresponding SDAP entity; or establishing a radio link control (RLC) entity and a packet data convergence protocol (PDCP) entity corresponding to a sidelink communication interface radio bearer, if a destination identifier corresponding to the RLC entity and the PDCP entity does not have a corresponding SDAP entity, establishing the corresponding SDAP entity.

3. The SDAP entity maintenance method according to claim 1, wherein maintaining the SDAP entity based on a destination identifier comprises:

establishing the SDAP entity based on implementation of the transmitting terminal.

4. The SDAP entity maintenance method according to claim 1, wherein if the transmitting terminal implements a state change, releasing the SDAP entities corresponding to all destination identifiers of the transmitting terminal comprises:

if the transmitting terminal implements a state change, after receiving SLRB configuration information of a sidelink communication radio interface after the state change, releasing the SDAP entities corresponding to all destination identifiers of the transmitting terminal; or, if the transmitting terminal implements the state change, starting a first timer, and after the first timer expires, releasing the SDAP entities corresponding to all destination identifiers of the transmitting terminal; or wherein after receiving the SLRB configuration information of the sidelink communication radio interface after the state change, the SDAP entity maintenance method further comprises:

notifying a sidelink communication receiving terminal to release the SDAP entities corresponding to all destination identifiers of the transmitting terminal.

5. The SDAP entity maintenance method according to claim 1, wherein if the transmitting terminal implements a state change, after releasing the SDAP entities corresponding to all destination identifiers of the transmitting terminal, the SDAP entity maintenance method further comprises:

establishing the SDAP entity according to the SLRB configuration information after the state change, wherein establishing the SDAP entity according to SLRB configuration information after the state change includes at least one of the following:

if the transmitting terminal changes from a radio resource control connected state to a radio resource control idle state or a radio resource control inactive state, establishing the SDAP entity according to SDAP configuration in SLRB configuration information configured in broadcast;
if the transmitting terminal changes from the radio resource control connected state to an offline state, establishing the SDAP entity according to SLRB configuration information configured in pre-configuration information;
if the transmitting terminal changes from the radio resource control idle state, the radio resource control inactive state or the offline state to the radio resource control connected state, establishing the SDAP entity according to SDAP configuration in SLRB configuration information configured in a destination signaling.

6. The SDAP entity maintenance method according to claim 1,
wherein if the transmitting terminal implements a state change, reconfiguring the SDAP entity according to destination SDAP configuration information corresponding to a ninth destination ID includes:
if the transmitting terminal implements the state change, and SDAP configuration corresponding to the ninth destination ID corresponding to the sidelink communication interface radio bearer (SLRB) before and after the change are different, determining destination SDAP configuration information;
reconfiguring the SDAP entity corresponding to the ninth destination ID according to the destination SDAP configuration information,
wherein if the transmitting terminal implements the state change, and SDAP configuration corresponding to the ninth destination ID corresponding to the sidelink communication interface radio bearer (SLRB) before and after the change are different, determining destination SDAP configuration information includes at least one of the following:
if the transmitting terminal changes from a radio resource control connected state to a radio resource control idle state or a radio resource control inactive state and SDAP configuration corresponding to the SLRB in the radio resource control connected state is different from SDAP configuration in the radio resource control idle state or the radio resource control inactive state, determining that the SDAP configuration information corresponding to the ninth destination ID configured in broadcast is the destination SDAP configuration information;
if the transmitting terminal changes from the radio resource control connected state to an offline state and the SDAP configuration corresponding to the SLRB in the radio resource control connected state is different from the SDAP configuration pre-configured in the offline state, determining that the SDAP configuration information corresponding to the ninth destination ID in the pre-configuration information is the destination SDAP configuration information;
if the transmitting terminal changes from the radio resource control idle state, the radio resource control inactive state or the offline state to the radio resource control connected state and the SDAP configuration corresponding to the SLRB in the radio resource control idle state, the radio resource control inactive state, or the offline state is different from the SDAP configuration in the radio resource control connected state, determining that the SDAP configuration information corresponding to the ninth destination ID in a destination signaling is the destination SDAP configuration information.

7. The SDAP entity maintenance method according to claim 1, wherein a communication type corresponding to the cast type includes: broadcast communication of the sidelink communication interface, multicast communication of the sidelink communication interface, or unicast communication of the sidelink communication interface.

8. A Service Data Adaptation Protocol (SDAP) entity maintenance method, which is performed by a receiving terminal, the SDAP entity maintenance method comprising:
maintaining an SDAP entity based on a destination identifier;
wherein the destination identifier includes: a combination of the sidelink communication destination ID and a cast type; or
the destination identifier includes: a combination of the sidelink communication source ID, the sidelink communication destination ID, and the cast type,
wherein maintaining the SDAP entity based on a destination identifier includes at least one of the following:
for sidelink communication interface unicast communication, receiving a first message sent by a sidelink communication opposite terminal for performing sidelink communication interface radio bearer (SLRB) configuration, if the first message includes SDAP configuration corresponding to a first destination ID and an SDAP entity corresponding to the SDAP configuration does not exist at the receiving terminal, establishing an SDAP entity corresponding to the SDAP configuration;
for the sidelink communication interface unicast communication, receiving a second message sent by the sidelink communication opposite terminal for performing the sidelink communication interface radio bearer (SLRB) configuration, and a second destination ID corresponding to the SLRB does not have a corresponding SDAP entity, establishing the corresponding SDAP entity;
for the sidelink communication interface radio bearer (SLRB), if a third destination ID corresponding to a radio link control (RLC) entity corresponding to the SLRB does not have a corresponding SDAP entity, establishing the corresponding SDAP entity; or
for the sidelink communication interface radio bearer (SLRB), if a third destination ID corresponding to a packet data convergence protocol (PDCP) entity corresponding to the SLRB does not have a corresponding SDAP entity, establishing the corresponding SDAP entity; or
for the sidelink communication interface radio bearer (SLRB), if a third destination ID corresponding to a radio link control (RLC) entity and a packet data convergence protocol (PDCP) entity corresponding to the SLRB does not have a corresponding SDAP entity, establishing the corresponding SDAP entity;
if a first PDCP entity or a first RLC entity corresponding to a fourth destination ID is established, establishing an SDAP entity corresponding to the fourth destination ID;
establishing an SDAP entity corresponding to a fifth destination ID based on implementation of the receiving terminal;
if a first data packet corresponding to a sixth destination ID is received, establishing an SDAP entity corresponding to the sixth destination ID, or, wherein maintaining the SDAP entity based on a destination identifier includes at least one of the following:
for sidelink communication interface unicast communication, receiving a sidelink communication interface unicast connection release message and releasing SDAP entities corresponding to all destination identifiers of the unicast connection, the sidelink communication interface unicast connection including:
sidelink communication interface radio resource control (PC5-RRC) connection or sidelink communication interface signaling protocol layer (PC5-S) connection;
if all sidelink communication interface radio bearer (SLRBs) corresponding to an SDAP entity corresponding to a seventh destination ID are released, releasing the SDAP entity corresponding to the seventh destination ID;
if a PDCP entity or a RLC entity corresponding to an SDAP entity corresponding to an eighth destination ID is released, releasing the SDAP entity corresponding to the eighth destination ID;
for a destination communication mode, if the receiving terminal implements a state change, releasing SDAP entities corresponding to all destination identifiers in the destination communication mode, wherein the destination communication mode includes broadcast communication or multicast communication, or,
wherein maintaining the SDAP entity based on a destination identifier comprises:
for sidelink communication interface unicast, if the SLRB configuration information corresponding to newly added or modified sidelink communication interface radio bearer (SLRB) includes SDAP configuration information corresponding to a ninth destination ID, reconfiguring the SDAP entity corresponding to the ninth destination ID, or,
wherein maintaining the SDAP entity based on a destination identifier comprises:
transmitting an establishment request or an establishment message of a first Quality of Service (QoS) flow associated with the first destination ID, and establishing an SDAP entity corresponding to the first destination ID, or,
wherein maintaining the SDAP entity based on a destination identifier comprises:
transmitting a first data packet of a QoS flow associated with the second destination ID, and establishing an SDAP entity corresponding to the second destination ID.

9. The SDAP entity maintenance method according to claim 8, wherein, if the receiving terminal implements a state change, releasing SDAP entities corresponding to all destination identifiers in the destination communication mode includes:
if the receiving terminal implements a state change, after receiving the SLRB configuration information of a sidelink communication radio interface after the state change, releasing the SDAP entities corresponding to all destination identifiers in the destination communication mode; or
if the receiving terminal implements a state change, starting a second timer, and after the second timer expires, releasing the SDAP entities corresponding to all destination identifiers in the destination communication mode.

10. The SDAP entity maintenance method according to claim 8, wherein if the receiving terminal implements a state change, after releasing SDAP entities corresponding to all destination identifiers in the destination communication mode, the method further comprises:
if the receiving terminal implements the state change and SDAP configuration before the state change is inconsistent with SDAP configuration after the state change, determining destination SDAP configuration information;
establishing a corresponding SDAP entity according to the destination SDAP configuration information,
wherein if the receiving terminal implements the state change and SDAP configuration before the state change is inconsistent with SDAP configuration after the state change, determining destination SDAP configuration information comprises at least one of:
the receiving terminal changing from an online state to an offline state, and SDAP configuration configured by a network in the online state being inconsistent with SDAP configuration pre-configured in the offline state, determining that the SDAP configuration information in pre-configuration information is the destination SDAP configuration information;
the receiving terminal changing from the offline state to the online state, and the SDAP configuration pre-configured in the offline state being inconsistent with the SDAP configuration configured by the network in the online state, determining that the SDAP configuration information configured by the network is the destination SDAP configuration information,
wherein the online state includes: at least one of a radio resource control connected state, a radio resource control idle state, or a radio resource control inactive state.

11. A transmitting terminal, comprising: a memory, a processor, and a program stored on the memory and executed by the processor; wherein the processor executes the program to implement the following steps:
maintaining a Service Data Adaptation Protocol (SDAP) entity based on a destination identifier;
wherein the destination identifier includes: a combination of the sidelink communication destination ID and a cast type; or
the destination identifier includes: a combination of the sidelink communication source ID, the sidelink communication destination ID, and the cast type,
wherein maintaining the SDAP entity based on a destination identifier comprises:
receiving an establishment request or an establishment message of a first Quality of Service (Qos) flow associated with a first destination ID, and establishing an SDAP entity corresponding to the first destination ID, or,
wherein maintaining the SDAP entity based on a destination identifier comprises:
receiving a first data packet of a QoS flow associated with a second destination ID, and establishing an SDAP entity corresponding to the second destination ID, or,
wherein maintaining the SDAP entity based on a destination identifier comprises:
transmitting first request information to a network device, wherein the first request information is used to request to obtain sidelink communication interface radio bearer (SLRB) configuration information corresponding to a QoS flow associated with a third destination ID;
receiving a first response message fed back by the network device, wherein the first response message is used to configure the SLRB configuration information corresponding to the QoS flow;

after a radio resource control (RRC) layer at the transmitting terminal receives the SLRB configuration information, if the SLRB configuration information carries the SDAP configuration information of the sidelink communication interface, establishing an SDAP entity corresponding to the SDAP configuration information, or if the SLRB configuration message carries the SDAP configuration information of the sidelink communication interface and the SDAP entity corresponding to the SDAP configuration information is not established, establishing the SDAP entity corresponding to the SDAP configuration information, or, wherein maintaining the SDAP entity based on a destination identifier comprises:

transmitting second request information to a network device, wherein the second request information is used to request to obtain SLRB configuration information corresponding to a QoS flow associated with a fourth destination ID;

receiving a second response message fed back by the network device, wherein the second response message is used to configure the SLRB configuration information corresponding to the QoS flow;

after a radio resource control (RRC) layer at the transmitting terminal obtains the SLRB configuration information, if the sidelink communication destination ID corresponding to the SLRB configuration information does not have a corresponding SDAP entity, establishing the corresponding SDAP entity, or, wherein maintaining the SDAP entity based on a destination identifier includes at least one of the following:

if a radio link failure (RLF) occurs on a sidelink communication interface of the transmitting terminal, releasing SDAP entities corresponding to all destination identifiers of the sidelink communication interface;

if a unicast connection release is applied to the sidelink communication interface of the transmitting terminal, releasing SDAP entities corresponding to all destination identifiers corresponding to the unicast connection;

if all sidelink communication interface radio bearer SLRBs corresponding to an SDAP entity corresponding to a fifth destination ID of the transmitting terminal are released, releasing the SDAP entity corresponding to the fifth destination ID;

if the transmitting terminal implements a state change, releasing the SDAP entities corresponding to all destination identifiers of the transmitting terminal;

releasing an SDAP entity corresponding to a sixth destination ID according to an instruction from a high layer;

releasing an SDAP entity corresponding to a seventh destination ID based on implementation of the transmitting terminal, or, wherein maintaining the SDAP entity based on a destination identifier includes at least one of the following:

if newly added or modified SLRB configuration information includes SDAP configuration information corresponding to an eighth destination ID, reconfiguring the SDAP entity;

if the transmitting terminal implements a state change, reconfiguring the SDAP entity according to destination SDAP configuration information corresponding to a ninth destination ID.

12. A receiving terminal, comprising: a memory, a processor, and a program stored on the memory and executed by the processor; wherein, the processor executes the program to implement the following steps:

maintaining an SDAP entity based on a destination identifier;

wherein the destination identifier includes: a combination of the sidelink communication destination ID and a cast type; or the destination identifier includes: a combination of the sidelink communication source ID, the sidelink communication destination ID, and the cast type, wherein maintaining the SDAP entity based on a destination identifier includes at least one of the following:

for sidelink communication interface unicast communication, receiving a first message sent by a sidelink communication opposite terminal for performing sidelink communication interface radio bearer (SLRB) configuration, if the first message includes SDAP configuration corresponding to a first destination ID and an SDAP entity corresponding to the SDAP configuration does not exist at the receiving terminal, establishing an SDAP entity corresponding to the SDAP configuration;

for the sidelink communication interface unicast communication, receiving a second message sent by the sidelink communication opposite terminal for performing the sidelink communication interface radio bearer (SLRB) configuration, and a second destination ID corresponding to the SLRB does not have a corresponding SDAP entity, establishing the corresponding SDAP entity;

for the sidelink communication interface radio bearer (SLRB), if a third destination ID corresponding to a radio link control (RLC) entity corresponding to the SLRB does not have a corresponding SDAP entity, establishing the corresponding SDAP entity; or for the sidelink communication interface radio bearer (SLRB), if a third destination ID corresponding to a packet data convergence protocol (PDCP) entity corresponding to the SLRB does not have a corresponding SDAP entity, establishing the corresponding SDAP entity; or for the sidelink communication interface radio bearer (SLRB), if a third destination ID corresponding to a radio link control (RLC) entity and a packet data convergence protocol (PDCP) entity corresponding to the SLRB does not have a corresponding SDAP entity, establishing the corresponding SDAP entity;

if a first PDCP entity or a first RLC entity corresponding to a fourth destination ID is established, establishing an SDAP entity corresponding to the fourth destination ID;

establishing an SDAP entity corresponding to a fifth destination ID based on implementation of the receiving terminal;

if a first data packet corresponding to a sixth destination ID is received, establishing an SDAP entity corresponding to the sixth destination ID, or, wherein maintaining the SDAP entity based on a destination identifier includes at least one of the following:

for sidelink communication interface unicast communication, receiving a sidelink communication interface unicast connection release message and releasing SDAP entities corresponding to all destination identifiers of the unicast connection, the sidelink communication interface unicast connection including:

sidelink communication interface radio resource control (PC5-RRC) connection or sidelink communication interface signaling protocol layer (PC5-S) connection;

if all sidelink communication interface radio bearer (SLRBs) corresponding to an SDAP entity corresponding to a seventh destination ID are released, releasing the SDAP entity corresponding to the seventh destination ID;
if a PDCP entity or a RLC entity corresponding to an SDAP entity corresponding to an eighth destination ID is released, releasing the SDAP entity corresponding to the eighth destination ID;
for a destination communication mode, if the receiving terminal implements a state change, releasing SDAP entities corresponding to all destination identifiers in the destination communication mode, wherein the destination communication mode includes broadcast communication or multicast communication, or,
wherein maintaining the SDAP entity based on a destination identifier comprises:
for sidelink communication interface unicast, if the SLRB configuration information corresponding to newly added or modified sidelink communication interface radio bearer (SLRB) includes SDAP configuration information corresponding to a ninth destination ID, reconfiguring the SDAP entity corresponding to the ninth destination ID, or,
wherein maintaining the SDAP entity based on a destination identifier comprises:
transmitting an establishment request or an establishment message of a first Quality of Service (QoS) flow associated with the first destination ID, and establishing an SDAP entity corresponding to the first destination ID, or,
wherein maintaining the SDAP entity based on a destination identifier comprises:
transmitting a first data packet of a QoS flow associated with the second destination ID, and establishing an SDAP entity corresponding to the second destination ID.

\* \* \* \* \*